United States Patent
Burr et al.

(10) Patent No.: US 8,332,567 B2
(45) Date of Patent: Dec. 11, 2012

(54) APPARATUS AND METHODS TO COMMUNICATIVELY COUPLE FIELD DEVICES TO CONTROLLERS IN A PROCESS CONTROL SYSTEM

(75) Inventors: Kent Allan Burr, Round Rock, TX (US); Gary Keith Law, Georgetown, TX (US); Doyle Eugene Broom, Georgetown, TX (US); Mark J. Nixon, Round Rock, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 506 days.

(21) Appl. No.: 11/533,259

(22) Filed: Sep. 19, 2006

(65) Prior Publication Data

US 2008/0126665 A1    May 29, 2008

(51) Int. Cl.
*G06F 13/36*    (2006.01)
*G06F 13/28*    (2006.01)
*G06F 13/12*    (2006.01)
*G06F 13/38*    (2006.01)

(52) U.S. Cl. .............................. 710/315; 710/25; 710/62
(58) Field of Classification Search .................... 710/25, 710/62, 315
See application file for complete search history.

(56) References Cited

U.S. PATENT DOCUMENTS

| | | | |
|---|---|---|---|
| 5,158,464 A | 10/1992 | Landrini | |
| 5,432,711 A | 7/1995 | Jackson et al. | |
| 5,828,851 A | 10/1998 | Nixon et al. | |
| 5,923,557 A | 7/1999 | Edison | |
| 6,008,985 A * | 12/1999 | Lake et al. | 361/679.32 |
| 6,012,096 A * | 1/2000 | Link et al. | 709/233 |
| 6,016,523 A | 1/2000 | Zimmerman et al. | |
| 6,095,850 A | 8/2000 | Liu | |
| 6,192,281 B1 | 2/2001 | Brown et al. | |
| 6,233,626 B1 * | 5/2001 | Swales et al. | 710/11 |
| 6,266,726 B1 | 7/2001 | Nixon et al. | |
| 6,272,575 B1 * | 8/2001 | Rajchel | 710/301 |

(Continued)

FOREIGN PATENT DOCUMENTS

CN    1170464 A    1/1998

(Continued)

OTHER PUBLICATIONS

UK Intellectual Property Office, "UK Search Report" dated Dec. 6, 2007, in connection with corresponding British Application No. GB0718038.3 (3 Pages).

(Continued)

*Primary Examiner* — Chun-Kuan Lee
*Assistant Examiner* — Farley Abad
(74) *Attorney, Agent, or Firm* — Hanley, Flight and Zimmerman, LLC

(57) ABSTRACT

Example apparatus and methods to communicatively couple field devices to controllers in a process control system are disclosed. A disclosed example apparatus includes a first interface configured to receive first information from a field device using a first communication protocol. The example apparatus also includes a communication processor communicatively coupled to the first interface and configured to encode the first information for communication via a bus using a second communication protocol. In addition, the example apparatus includes a second interface communicatively coupled to the communication processor and the bus and configured to communicate the first information via the bus using the second communication protocol. The bus is configured to use the second communication protocol to communicate second information associated with another field device.

25 Claims, 14 Drawing Sheets

U.S. PATENT DOCUMENTS

| | | | |
|---|---|---|---|
| 6,397,225 | B1 | 5/2002 | Brown et al. |
| 6,711,698 | B1 * | 3/2004 | Marbach et al. .................. 714/4 |
| 2003/0014536 | A1 | 1/2003 | Christensen et al. |
| 2003/0200532 | A1 * | 10/2003 | Gensel .......................... 717/120 |
| 2005/0288799 | A1 * | 12/2005 | Brewer et al. ..................... 700/1 |
| 2007/0233323 | A1 * | 10/2007 | Wiemeyer et al. ............ 700/276 |
| 2008/0005406 | A1 * | 1/2008 | Odom et al. .................... 710/58 |
| 2009/0168857 | A1 * | 7/2009 | Golborne et al. ............. 375/223 |

FOREIGN PATENT DOCUMENTS

| | | |
|---|---|---|
| CN | 1417654 A | 5/2003 |
| CN | 2716875 | 8/2005 |
| CN | 1700125 | 11/2005 |
| GB | 2383476 A | 6/2003 |
| JP | 11126104 | 5/1999 |
| JP | 2000-214913 | 8/2000 |
| WO | 97/19396 A1 | 5/1997 |
| WO | 0123971 | 4/2001 |
| WO | 03013104 | 2/2003 |

OTHER PUBLICATIONS

United States Patent and Trademark Office, "PCT International Search Report" dated Dec. 20, 2008, in connection with International Application No. PCT/US02/21698 (2 Pages).

Gray Jr., James O., Integration Foundation Fieldbus Into a Distributed Control System, Foundation Fieldbus in the real world, Seminar Amsterdam, Nov. 30, 2000, 35 pages.

State Intellectual Property Office of P.R. China "The Notification of the First Office Action," issued on Aug. 24, 2010, in Chinese Application No. 200710152176.9, 9 pages.

Intellectual Property Office, "Examination Report," issued on Oct. 15, 2010, in Great Britain Patent Application No. GB0718038.3, 4 pages.

Intellectual Property Office, "Combined Search and Examination Report," issued on May 27, 2011, in Great Britain Patent Application No. GB1106342.7, 2 pages.

Intellectual Property Office, "Combined Search and Examination Report," issued on May 31, 2011, in Great Britain Patent Application No. GB1106344.3, 2 pages.

Intellectual Property Office, "Combined Search and Examination Report," issued on Jun. 1, 2011, in Great Britain Patent Application No. GB1106341.9, 3 pages.

Gray Jr., James O., Integrating Foundation Fieldbus Into a Distributed Control System, Foundation Fieldbus in the real world, Seminar Amsterdam, Nov. 30, 2000, 35 pages.

State Intellectual Property Office of P.R. China, "First Office Action," issued on May 3, 2012, in Chinese Patent Application No. 201110026566.8, 6 pages.

State Intellectual Property Office of P.R. China, "First Office Action," issued on Apr. 20, 2012, in Chinese Patent Application No. 201110026540.3, 6 pages.

State Intellectual Property Office of P.R. China, "Second Office Action," issued on Dec. 16, 2011, in Chinese Patent Application No. 200710152176.9, 6 pages.

Japanese Patent Office, "Notice of Reasons for Rejection," issued on Jun. 5, 2012, in Japanese Patent Application No. 2007-242221, 6 pages.

* cited by examiner

APPARATUS AND METHODS TO COMMUNICATIVELY COUPLE FIELD DEVICES TO CONTROLLERS IN A PROCESS CONTROL SYSTEM

FIELD OF THE DISCLOSURE

The present disclosure relates generally to process control systems and, more particularly, to apparatus and methods to communicatively couple field devices to controllers in a process control system.

BACKGROUND

Process control systems, like those used in chemical, petroleum, pharmaceutical, pulp and paper, or other manufacturing processes, typically include one or more process controllers communicatively coupled to at least one host including at least one operator workstation and to one or more field devices configured to communicate via analog, digital or combined analog/digital communication protocols. The field devices, which may be, for example, device controllers, valves, valve actuators, valve positioners, switches and transmitters (e.g., temperature, pressure, flow rate, and chemical composition sensors) or combinations thereof, perform functions within the process control system such as opening or closing valves and measuring or inferring process parameters. A process controller receives signals indicative of process measurements made by the field devices and/or other information pertaining to the field devices, uses this information to implement a control routine, and generates control signals that are sent over the buses or other communication lines to the field devices to control the operation of the process control system.

A process control system can include a plurality of field devices that provide several different functional capabilities and that are often communicatively coupled to process controllers using two-wire interfaces in a point-to-point (e.g., one field device communicatively coupled to a field device bus) or a multi-drop (e.g., a plurality of field device communicatively coupled to a field device bus) wiring connection arrangements or with wireless communications. Some field devices are configured to operate using relatively simple commands and/or communications (e.g., an ON command and an OFF command). Other field devices are more complex requiring more commands and/or more communication information, which may or may not include simple commands. For example, more complex field devices may communicate analog values with digital communications superimposed on the analog value using, for example, a Highway Addressable Remote Transducer ("HART") communication protocol. Other field devices can use entirely digital communications (e.g., a FOUNDATION Fieldbus communication protocol).

In a process control system, each field device is typically coupled to a process controller via one or more I/O cards and a respective communication medium (e.g., a two-wire cable, a wireless link, or an optical fiber). Thus, a plurality of communication media are required to communicatively couple a plurality of field devices to a process controller. Often the plurality of communication media coupled to the field devices are routed through one or more field junction boxes, at which point, the plurality of communication media are coupled to respective communication media (e.g., respective two-wire conductors) of a multi-conductor cable used to communicatively couple the field devices to the process controller via one or more I/O cards.

SUMMARY

Example apparatus and methods to communicatively couple field devices to controllers in a process control system are described. In accordance with an example, an example apparatus includes a first interface configured to receive first information from a field device using a first communication protocol. The example apparatus also includes a communication processor communicatively coupled to the first interface and configured to encode the first information for communication via a bus using a second communication protocol. In addition, the example apparatus includes a second interface communicatively coupled to the communication processor and the bus and configured to communicate the first information via the bus using the second communication protocol. The bus is configured to use the second communication protocol to communicate second information associated with another field device.

In accordance with another example, an example method involves receiving first information from a field device using a first communication protocol. The first information is then encoded for communication using a second communication protocol configured to communicate second information associated with another field device. The first information is then communicated to a controller via a bus using the second communication protocol.

In accordance with yet another example, an example apparatus includes a plurality of sockets configured to receive a plurality of termination modules. Each of the termination modules is configured to be communicatively coupled to at least one field device in a process control system. The example apparatus also includes a communication bus interface communicatively coupled to each of the plurality of sockets and configured to communicate first field device information associated with one of the termination modules and second field device information associated with a second one of the termination modules.

In accordance with a further example, an example apparatus includes a connection detector configured to detect a connection to a field device. The example apparatus also includes a field device identifier configured to determine field device identification information indicative of the identity of the field device. In addition, the example apparatus includes a display interface configured to display the field device identification information.

In accordance with yet a further example, an example apparatus includes a first isolation circuit communicatively coupled to termination module circuitry and configured to be communicatively coupled to a bus. The termination module circuitry is configured to communicate with a field device and the bus enables the termination module to communicate with a controller. The example apparatus also includes a second isolation circuit communicatively coupled to the termination module circuitry and configured to be communicatively coupled to a power supply that provides electrical power to the termination module circuitry.

DETAILED DESCRIPTION

Although the following describes example apparatus and systems including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the following describes example apparatus and systems, persons of ordinary skill in the art will readily appreciate that the examples provided are not the only way to implement such apparatus and systems.

Figure 1A:
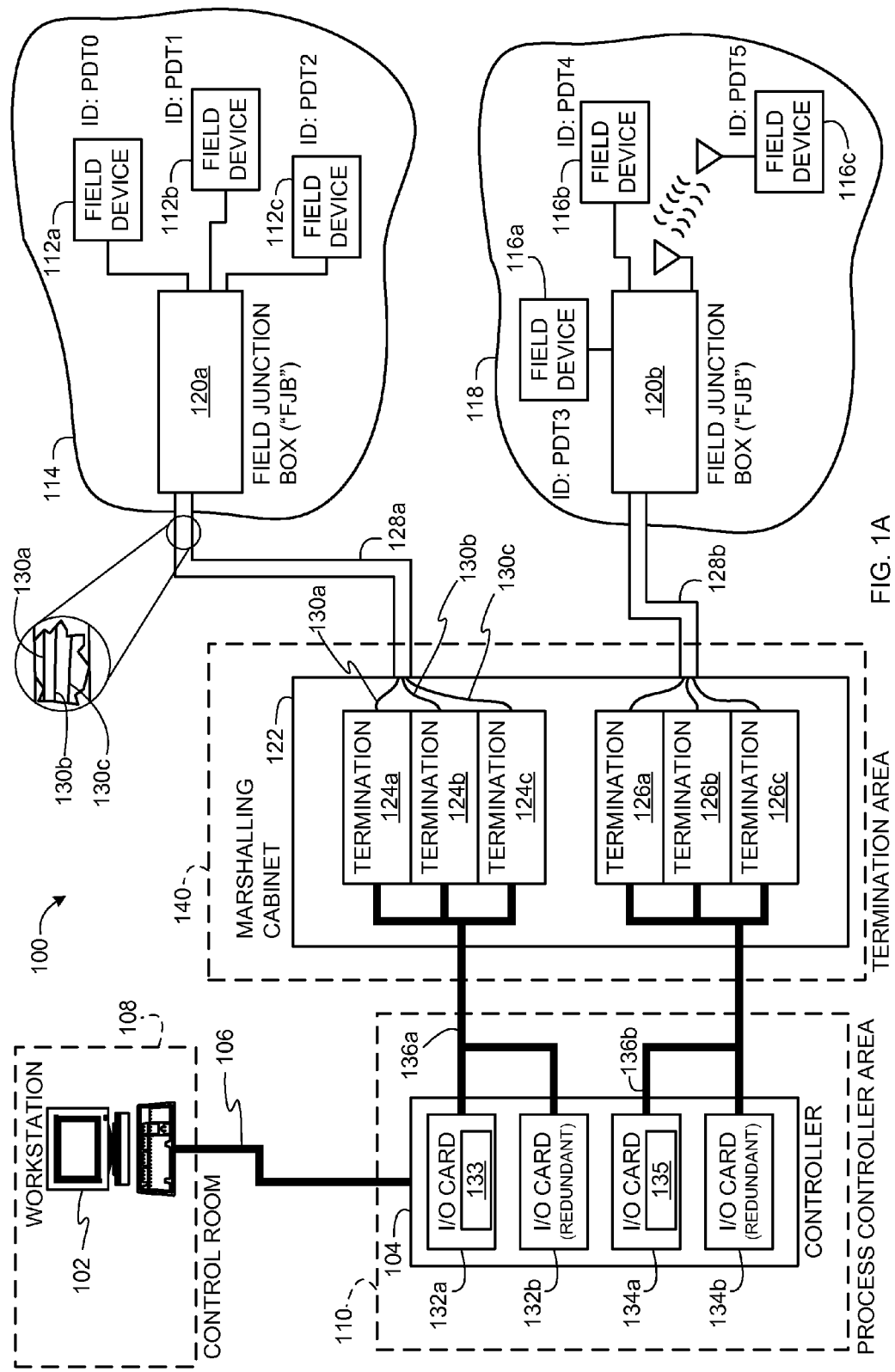
FIG. 1A is a block diagram illustrating an example process control system.

An example process control system includes a control room (e.g., a control room 108 of FIG. 1A), a process controller area (e.g. a process controller area 110 of FIG. 1A), a termination area (e.g., a termination area 140 of FIG. 1A), and one or more process areas (e.g., process areas 114 and 118 of FIG. 1A). A process area includes a plurality of field devices that perform operations (e.g., controlling valves, controlling motors, controlling boilers, monitoring, measuring parameters, etc.) associated with performing a particular process (e.g., a chemical process, a petroleum process, a pharmaceutical process, a pulp and paper process, etc.). Some process areas are not accessible by humans due to harsh environment conditions (e.g., relatively high temperatures, airborne toxins, unsafe radiation levels, etc.) The control room typically includes one or more workstations within an environment that is safely accessible by humans. The workstations include user applications that users (e.g., engineers, operators, etc.) can access to control operations of the process control system by, for example, changing variable values, process control functions, etc. The process control area includes one or more controllers communicatively coupled to the workstation(s) in the control room. The controllers automate control of the field devices in the process area by executing process control strategies implemented via the workstation. An example process strategy involves measuring a pressure using a pressure sensor field device and automatically sending a command to a valve positioner to open or close a flow valve based on the pressure measurement. The termination area includes a marshalling cabinet that enables the controllers to communicate with the field devices in the process area. In particular, the marshalling cabinet includes a plurality of termination modules used to marshal, organize, or route signals from the field devices to one or more I/O cards communicatively coupled to the controllers. The I/O cards translate information received from the field devices to a format compatible with the controllers and translate information from the controllers to a format compatible with the field devices.

Known techniques used to communicatively couple field devices within a process control system to controllers involve using a separate bus (e.g., a wire, a cable, or a circuit) between each field device and a respective I/O card communicatively coupled to a controller (e.g., a process controller, a programmable logic controller, etc.). An I/O card enables communicatively coupling a controller to a plurality of field devices associated with different data types or signal types (e.g., analog in (AI) data types, analog out (AO) data types, discrete in (DI) data types, discrete out (DO) data types, digital in data types, and digital out data types)) and different field device communication protocols by translating or converting information communicated between the controller and the field devices. For example, an I/O card may be provided with one or more field device interfaces configured to exchange information with a field device using the field device communication protocol associated with that field device. Different field device interfaces communicate via different channel types (e.g., analog in (AI) channel types, analog out (AO) channel types, discrete in (DI) channel types, discrete out (DO) channel types, digital in channel types, and digital out channel types)). In addition, the I/O card can convert information (e.g., voltage levels) received from the field device into information (e.g., pressure measurement values) that the controller can use to perform operations associated with controlling the field device. The known techniques require a bundle of wires or buses (e.g., a multi-core cable) to communicatively couple a plurality of field devices to I/O cards. Unlike known techniques that use a separate bus to communicatively couple each field device to I/O cards, the example apparatus and methods described herein may be used to communicatively couple field devices to an I/O card by terminating a plurality of field devices at a termination panel (e.g., a marshalling cabinet) and using one bus (e.g., a conductive communication medium, an optical communication medium, a wireless communication medium) communicatively coupled between the termination panel and the I/O card to communicatively couple the field devices to the I/O card.

The example apparatus and methods described herein involve using an example universal I/O bus (e.g., a common or shared communication bus) that communicatively couples one or more termination modules to one or more I/O cards communicatively coupled to a controller. Each termination module is communicatively coupled to one or more respective field devices using a respective field device bus (e.g., an analog bus or a digital bus). The termination modules are configured to receive field device information from the field devices via the field device buses and communicate the field device information to the I/O cards via the universal I/O bus by, for example, packetizing the field device information and communicating the packetized information to the I/O cards via the universal I/O bus. The field device information may include, for example, field device identification information (e.g., device tags, electronic serial numbers, etc.), field device status information (e.g., communication status, diagnostic health information (open loop, short, etc.)), field device activity information (e.g., process variable (PV) values), field device description information (e.g., field device type or function such as, for example, valve actuator, temperature sensor, pressure sensor, flow sensor, etc.), field device connection configuration information (e.g., multi-drop bus connection, point-to-point connection, etc.), field device bus or segment identification information (e.g., field device bus or field device segment via which field device is communicatively coupled to termination module), and/or field device data type information (e.g., a data type descriptor indicative of the data type used by a particular field device). The I/O card(s) can extract the field device information received via the universal I/O bus and communicate the field device information to the controller, which can then communicate some or all of the information to one or more workstation terminals for subsequent analysis.

To communicate field device information (e.g., commands, instructions, queries, threshold activity values (e.g., threshold PV values), etc.) from workstation terminals to field devices, I/O cards can packetize the field device information and communicate the packetized field device information to a plurality of termination modules. Each of the termination modules can then extract or depacketize respective field device information from the packetized communications received from a respective I/O card and communicate the field device information to a respective field device.

In the illustrated examples described herein, a termination panel (e.g., a marshalling cabinet) is configured to receive (e.g., connect to) a plurality of termination modules, each of which is communicatively coupled to a different field device. To indicate at the termination panel which termination modules are connected to which field devices, each termination module is provided with a termination labeler (or tagging system). A termination labeler includes an electronic display (e.g., a liquid crystal display (LCD)) and components to determine which field device or devices is/are connected to the termination module corresponding to the termination labeler. In some example implementations, displays are mounted on the termination panel instead of the termination modules. Each of the displays is mounted in association with a respective termination module socket. In this manner, when a termination module is removed from the termination panel, a corresponding display remains on the termination panel for use by a subsequently connected termination module.

Now turning to FIG. 1A, an example process control system 100 includes a workstation 102 communicatively coupled to a controller 104 via a bus or local area network (LAN) 106, which is commonly referred to as an application control network (ACN). The LAN 106 may be implemented using any desired communication medium and protocol. For example, the LAN 106 may be based on a hardwired or wireless Ethernet communication protocol. However, any other suitable wired or wireless communication medium and protocol could be used. The workstation 102 may be configured to perform operations associated with one or more information technology applications, user-interactive applications, and/or communication applications. For example, the workstation 102 may be configured to perform operations associated with process control-related applications and communication applications that enable the workstation 102 and the controller 104 to communicate with other devices or systems using any desired communication media (e.g., wireless, hardwired, etc.) and protocols (e.g., HTTP, SOAP, etc.). The controller 104 may be configured to perform one or more process control routines or functions that have been generated by a system engineer or other system operator using, for example, the workstation 102 or any other workstation and which have been downloaded to and instantiated in the controller 104. In the illustrated example, the workstation 102 is located in a control room 108 and the controller 104 is located in a process controller area 110 separate from the control room 108.

In the illustrated example, the example process control system 100 includes field devices 112a-c in a first process area 114 and field devices 116a-c in a second process control area 118. To communicate information between the controller 104 and the field devices 112a-c and 116a-c, the example process control system 100 is provided with field junction boxes (FJB's) 120a-b and a marshalling cabinet 122. Each of the field junction boxes 120a-b routes signals from respective ones of the field devices 112a-c and 116a-c to the marshalling cabinet 122. The marshalling cabinet 122, in turn, marshals (e.g., organizes, groups, etc) information received from field devices 112a-c and 116a-c and routes the field device information to respective I/O cards (e.g., I/O cards 132a-b and 134a-b) of the controller 104. In the illustrated example, the communications between the controller 104 and the field devices 112a-c and 116a-c are bidirectional so that the marshalling cabinet 122 is also used to route information received from I/O cards of the controller 104 to respective ones of the field devices 112a-c and 116a-c via the field junction boxes 120a-b.

In the illustrated example, the field devices 112a-c are communicatively coupled to the field junction box 120a and the field devices 116a-c are communicatively coupled to the field junction box 120b via electrically conductive, wireless, and/or optical communication media. For example, the field junction boxes 120a-b may be provided with one or more electrical, wireless, and/or optical data transceivers to communicate with electrical, wireless, and/or optical transceivers of the field devices 112a-c and 116a-c. In the illustrated example, the field junction box 120b is communicatively coupled wirelessly to the field device 116c. In an alternative example implementation, the marshalling cabinet 122 may be omitted and signals from the field devices 112a-c and 116a-c can be routed from the field junction boxes 120a-b directly to the I/O cards of the controller 104. In yet another example implementation, the field junction boxes 120a-b may be omitted and the field devices 112a-c and 116a-c can be directly connected to the marshalling cabinet 122.

The field devices 112a-c and 116a-c may be Fieldbus compliant valves, actuators, sensors, etc., in which case the field devices 112a-c and 116a-c communicate via a digital data bus using the well-known Fieldbus communication protocol. Of course, other types of field devices and communication protocols could be used instead. For example, the field devices 112a-c and 116a-c could instead be Profibus, HART, or AS-i compliant devices that communicate via the data bus using the well-known Profibus and HART communication protocols. In some example implementations, the field devices 112a-c and 116a-c can communicate information using analog communications or discrete communications instead of digital communications. In addition, the communication protocols can be used to communicate information associated with different data types.

Each of the field devices 112a-c and 116a-c is configured to store field device identification information. The field device identification information may be a physical device tag (PDT) value, a device tag name, an electronic serial number, etc. that uniquely identifies each of the field devices 112a-c and 116a-c. In the illustrated example of FIG. 1A, the field devices 112a-c store field device identification information in the form of physical device tag values PDT0-PDT2 and the field devices 116a-c store field device identification information in the form of physical device tag values PDT3-PDT5. The field device identification information may be stored or programmed in the field devices 112a-c and 116a-c by a field device manufacturer and/or by an operator or engineer involved in installation of the field devices 112a-c and 116a-c.

To route information associated with the field devices 112a-c and 116a-c in the marshalling cabinet 122, the marshalling cabinet 122 is provided with a plurality of termination modules 124a-c and 126a-c. The termination modules 124a-c are configured to marshal information associated with the field devices 112a-c in the first process area 114 and the termination modules 126a-c are configured to marshal information associated with the field devices 116a-c in the second process area 118. As shown, the termination modules 124a-c and 126a-c are communicatively coupled to the field junction boxes 120a-b via respective multi-conductor cables 128a and 128b (e.g., a multi-bus cable). In an alternative example implementation in which the marshalling cabinet 122 is omitted, the termination modules 124a-c and 126a-c can be installed in respective ones of the field junction boxes 120a-b.

The illustrated example of FIG. 1A depicts a point-to-point configuration in which each conductor or conductor pair (e.g., bus, twisted pair communication medium, two-wire communication medium, etc.) in the multi-conductor cables 128a-b communicates information uniquely associated with a respective one of the field devices 112a-c and 116a-c. For example, the multi-conductor cable 128a includes a first conductor 130a, a second conductor 130b, and a third conductor 130c. Specifically, the first conductor 130a is used to form a first data bus configured to communicate information between the termination module 124a and the field device 112a, the second conductor 130b is used to form a second data bus configured to communicate information between the termination module 124b and the field device 112b, and the third conductor 130c is used to form a third data bus configured to communicate information between the termination module 124c and the field device 112c. In an alternative example implementation using a multi-drop wiring configuration, each of the termination modules 124a-c and 126a-c can be communicatively coupled with one or more field devices. For example, in a multi-drop configuration, the termination module 124a can be communicatively coupled to the field device 112a and to another field device (not shown) via the first conductor 130a. In some example implementations, a termination module can be configured to communicate wirelessly with a plurality of field devices using a wireless mesh network.

Each of the termination modules 124a-c and 126a-c may be configured to communicate with a respective one of the field devices 112a-c and 116a-c using a different data type. For example, the termination module 124a may include a digital field device interface to communicate with the field device 112a using digital data while the termination module 124b may include an analog field device interface to communicate with the field device 112b using analog data.

To control I/O communications between the controller 104 (and/or the workstation 102) and the field devices 112a-c and 116a-c, the controller 104 is provided with the plurality of I/O cards 132a-b and 134a-b. In the illustrated example, the I/O cards 132a-b are configured to control I/O communications between the controller 104 (and/or the workstation 102) and the field devices 112a-c in the first process area 114, and the I/O cards 134a-b are configured to control I/O communications between the controller 104 (and/or the workstation 102) and the field devices 116a-c in the second process area 118.

In the illustrated example of FIG. 1A, the I/O cards 132a-b and 134a-b reside in the controller 104. To communicate information from the field devices 112a-c and 116a-c to the workstation 102, the I/O cards, 132a-b and 134a-b communicate the information to the controller 104 and the controller 104 communicates the information to the workstation 102. Similarly, to communicate information from the workstation 102 to the field devices 112a-c and 116a-c, the workstation 102 communicates the information to the controller 104, the controller 104 then communicates the information to the I/O cards 132a-b and 134a-b, and the I/O cards 132a-b and 134a-b communicate the information to the field devices 112a-c and 116a-c via the termination modules 124a-c and 126a-c. In an alternative example implementation, the I/O cards 132a-b and 134a-b can be communicatively coupled to the LAN 106 internal to the controller 104 so that the I/O cards 132a-b and 134a-b can communicate directly with the workstation 102 and/or the controller 104.

To provide fault tolerant operations in the event that either of the I/O cards 132a and 134a fails, the I/O cards 132b and 134b are configured as redundant I/O cards. That is, if the I/O card 132a fails, the redundant I/O card 132b assumes control and performs the same operations as the I/O card 132a would otherwise perform. Similarly, the redundant I/O card 134b assumes control when the I/O card 134a fails.

To enable communications between the termination modules 124a-c and the I/O cards 132a-b and between the termination modules 126a-c and the I/O cards 134a-b, the termination modules 124a-c are communicatively coupled to the I/O cards 132a-b via a first universal I/O bus 136a and the termination modules 126a-c are communicatively coupled to the I/O cards 134a-b via a second universal I/O bus 136b. Unlike the multi-conductor cables 128a and 128b, which use separate conductors or communication mediums for each one of the field devices 112a-c and 116a-c, each of the universal I/O buses 136a-b is configured to communicate information corresponding to a plurality of field devices (e.g., the field devices 112a-c and 116a-c) using the same communication medium. For example, the communication medium may be a serial bus, a two-wire communication medium (e.g., twisted-pair), an optical fiber, a parallel bus, etc. via which information associated with two or more field devices can be communicated using, for example, packet-based communication techniques, multiplexing communication techniques, etc.

In an example implementation, the universal I/O buses 136a-b are implemented using the RS-485 serial communication standard. The RS-485 serial communication standard can be configured to use less communication control overhead (e.g., less header information) than other known communication standards (e.g., Ethernet). However, in other example implementations, the universal I/O buses 136a-b can be implemented using any other suitable communication standard including Ethernet, universal serial bus (USB), IEEE 1394, etc. In addition, although the universal I/O buses 136a-b are described above as wired communication mediums, in another example implementation, one or both of the universal I/O buses 136a-b can be implemented using a wireless communication medium (e.g., wireless Ethernet, IEEE-802.11, Wi-Fi®, Bluetooth®, etc.).

The universal I/O buses 136a and 136b are used to communicate information in substantially the same manner. In the illustrated example, the I/O bus 136a is configured to communicate information between the I/O cards 132a-b and the termination modules 124a-c. The I/O cards 132a-b and the termination modules 124a-c use an addressing scheme to enable the I/O cards 132a-b to identify which information corresponds to which one of the termination modules 124a-c and to enable each of the termination modules 124a-c to determine which information corresponds to which of the field devices 112a-c. When a termination module (e.g., one of the termination modules 124a-c and 126a-c) is connected to one of the I/O cards 132a-b and 134a-b, that I/O card automatically obtains an address of the termination module (from, for example, the termination module) to exchange information with the termination module. In this manner, the termination modules 124a-c and 126a-c can be communicatively coupled anywhere on the respective buses 136a-b without having to manual supply termination module addresses to the I/O cards 132a-b and 134a-b and without having to individually wire each of the termination modules 124a-c and 126a-c to the I/O cards 132a-b and 134a-b.

By using the universal I/O buses 136a-b, the number of communication media (e.g., wires) required to communicate information between the marshalling cabinet 122 and the controller 104 is substantially reduced relative to known configurations that require a separate communication medium for each termination module to communicate with a controller. Reducing the number of communication media (e.g., reducing the number of communication buses or communication wires) required to communicatively couple the marshalling cabinet 122 to the controller 104 reduces engineering costs required to design and generate drawings for installation of the connections between the controller 104 and the field devices 112a-c and 116a-c. In addition, reducing the number of communication media, in turn, reduces installation costs and maintenance costs. For example, one of the I/O buses 136a-b replaces a plurality of communication media used in known systems to communicatively couple field devices to a controller. Therefore, instead of maintaining a plurality of communication media for communicatively coupling the field devices 112a-c and 116a-c to the I/O cards 132a-b and 134a-b, the illustrated example of FIG. 1A requires substantially less maintenance by using the I/O buses 136a-b.

In addition, reducing the number of communication media required to communicatively couple the marshalling cabinet 122 to the I/O cards 132a-b and 134a-b results in more available space for more termination modules (e.g., the termination modules 124a-b and 124a-c), thereby increasing the I/O density of the marshalling cabinet 122 relative to known systems. In the illustrated example of FIG. 1A, the marshalling cabinet 122 can hold a number of termination modules that would otherwise require more marshalling cabinets (e.g., three marshalling cabinets) in a known system implementation.

By providing the termination modules 124a-c and the termination modules 126a-c that can be configured to use different data type interfaces (e.g., different channel types) to communicate with the field devices 112a-c and 116a-c and that are configured to use respective common I/O buses 136a and 136b to communicate with the I/O cards 132a-b and 134a-b, the illustrated example of FIG. 1A enables routing data associated with different field device data types (e.g., the data types or channel types used by the field devices 112a-c and 116a-c) to the I/O cards 132a-b and 134a-b without having to implement a plurality of different field device interface types on the I/O cards 132a-b and 134a-b. Therefore, an I/O card having one interface type (e.g., an I/O bus interface type for communicating via the I/O bus 136a and/or the I/O bus 136b) can communicate with a plurality of field devices having different field device interface types.

Using the I/O bus 136a and/or the I/O bus 136b to exchange information between the controller 104 and the termination modules 124a-c and 126a-c enables defining field device-to-I/O card connection routing late in a design or installation process. For example, the termination modules 124a-c and 126a-c can be placed in various locations within the marshalling cabinet 122 while maintaining access to a respective one of the I/O buses 136a and 136b.

In the illustrated example, the marshalling cabinet 122, the termination modules 124a-c and 126a-c, the I/O cards 132a-b and 134a-b, and the controller 104 facilitate migrating existing process control system installations to a configuration substantially similar to the configuration of the example process control system 100 of FIG. 1A. For example, because the termination modules 124a-c and 126a-c can be configured to include any suitable field device interface type, the termination modules 124a-c and 126a-c can be configured to be communicatively coupled to existing field devices already installed in a process control system. Similarly, the controller 104 can be configured to include a known LAN interface to communicate via a LAN to an already installed workstation. In some example implementations, the I/O cards 132a-b and 134a-b can be installed in or communicatively coupled to known controllers so that controllers already installed in a process control system need not be replaced.

In the illustrated example, the I/O card 132a includes a data structure 133 and the I/O card 134a includes a data structure 135. The data structure 133 stores the field device identification numbers (e.g., field device identification information) corresponding to field devices (e.g., the field devices 112a-c) that are assigned to communicate with the I/O card 132a via the universal I/O bus 136a. The termination modules 124a-c can use the field device identification numbers stored in the data structure 133 to determine whether a field device is incorrectly connected to one of the termination modules 124a-c. The data structure 135 stores the field device identification numbers (e.g., field device identification information) corresponding to field devices (e.g., the field devices 116a-c) that are assigned to communicate with the I/O card 134a via the universal I/O bus 136b. The data structures 133 and 135 can be populated by engineers, operators, and/or users via the workstation 102 during a configuration time or during operation of the example process control system 100. Although not shown, the redundant I/O card 132b stores a data structure identical to the data structure 133 and the redundant I/O card 134b stores a data structure identical to the data structure 135. Additionally or alternatively, the data structures 133 and 135 can be stored in the workstation 102.

In the illustrated example, the marshalling cabinet 122 is shown located in a termination area 140 separate from the process control area 110. By using the I/O buses 136a-b instead of substantially more communication media (e.g., a plurality of communication buses, each uniquely associated with one of the field devices 112a-c and 116a-c) to communicatively couple the termination modules 124a-c and 126a-c to the controller 104 facilitates locating the controller 104 relatively farther from the marshalling cabinet 122 than in known configurations without substantially decreasing the reliability of communications. In some example implementations, the process control area 110 and the termination area 140 can be combined so that the marshalling cabinet 122 and the controller 104 are located in the same area. In any case, placing the marshalling cabinet 122 and the controller 104 in areas separate from the process areas 114 and 118 enables isolating the I/O cards 132*a-b* and 134*a-b*, the termination modules 124*a-c* and 126*a-c* and the universal I/O buses 136*a-b* from harsh environmental conditions (e.g., heat, humidity, electromagnetic noise, etc.) that may be associated with the process areas 114 and 118. In this manner, the cost and complexity of designing and manufacturing the termination modules 124*a-c* and 126*a-c* and the I/O cards 132*a-b* and 134*a-b* can be substantially reduced relative to the cost of manufacturing communications and control circuitry for the field devices 112*a-c* and 116*a-c* because the termination modules 124*a-c* and 126*a-c* and the I/O cards 132*a-b* and 134*a-b* do not require operating specification features (e.g., shielding, more robust circuitry, more complex error checking, etc.) required to guarantee reliable operation (e.g., reliable data communications) as would otherwise be necessary to operate in the environmental conditions of the process areas 114 and 118.

Figure 1B:
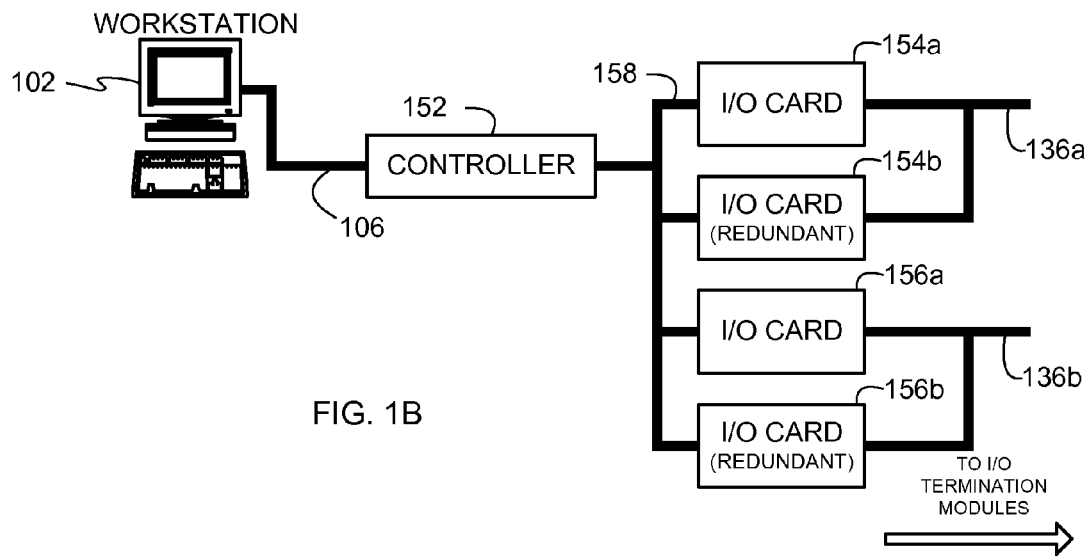
FIGS. 1B-1D depict alternative example implementations that may be used to communicatively couple workstations, controllers, and I/O cards.
Figure 1C:
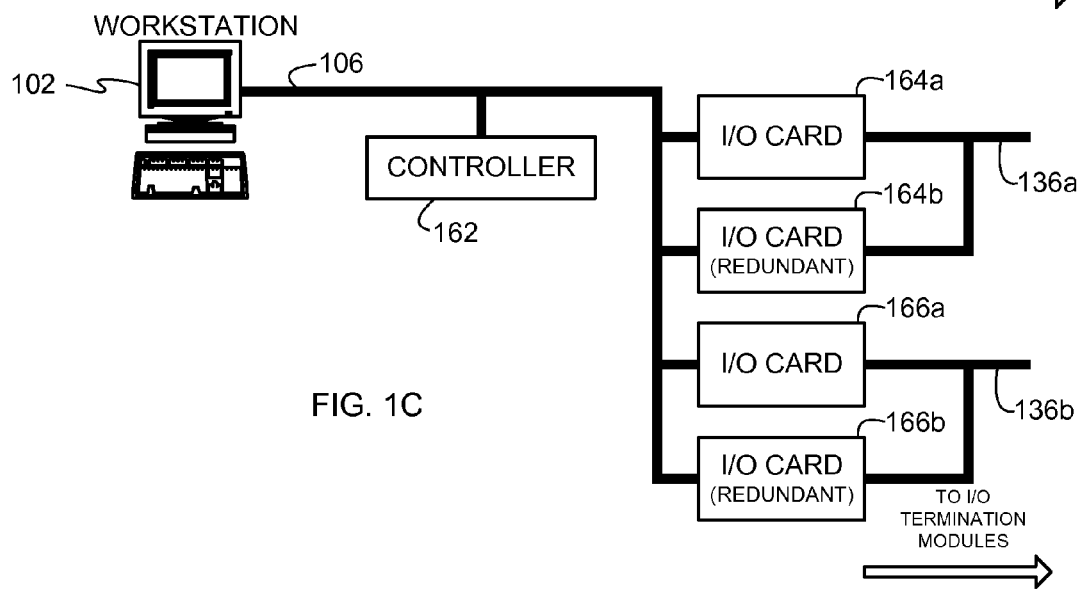
Figure 1D:
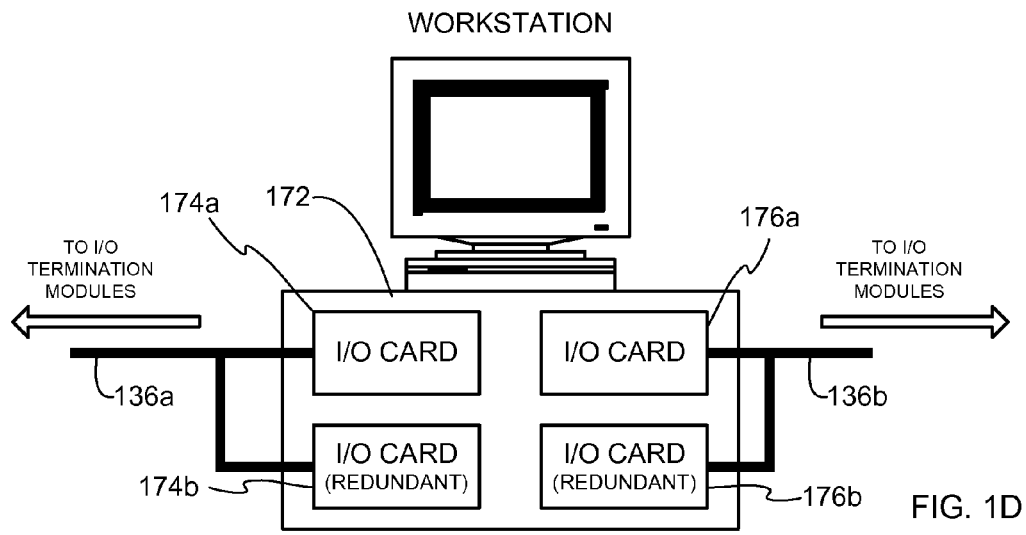

FIGS. 1B-1D depict alternative example implementations that may be used to communicatively couple workstations, controllers, and I/O cards. For example, in the illustrated example depicted in FIG. 1B a controller 152 (which performs substantially the same functions as the controller 104 of FIG. 1A) is communicatively coupled to I/O cards 154*a-b* and 156*a-b* via a backplane communication bus 158. The I/O cards 154*a-b* and 156*a-b* perform substantially the same functionality as the I/O cards 132*a-b* and 134*a-b* of FIG. 1A and are configured to be communicatively coupled to the universal I/O buses 136*a-b* to exchange information with the termination modules 124*a-c* and 126*a-c*. To communicate with the workstation 102, the controller 152 is communicatively coupled to the workstation 102 via the LAN 106.

In another illustrated example depicted in FIG. 1C a controller 162 (which performs substantially the same functions as the controller 104 of FIG. 1A) is communicatively coupled to the workstation 102 and a plurality of I/O cards 164*a-b* and 166*a-b* via the LAN 106. The I/O cards 164*a-b* and 166*a-b* perform substantially the same functionality as the I/O cards 132*a-b* and 134*a-b* of FIG. 1A and are configured to be communicatively coupled to the universal I/O buses 136*a-b* to exchange information with the termination modules 124*a-c* and 126*a-c*. However, unlike the I/O cards 132*a-b* and 134*a-b* of FIG. 1A and the I/O cards 154*a-b* and 156*a-b* of FIG. 1B, the I/O cards 164*a-b* and 166*a-b* are configured to communicate with the controller 162 and the workstation 102 via the LAN 102. In this manner, the I/O cards 164*a-b* and 166*a-b* can exchange information directly with the workstation 102.

In yet another illustrated example depicted in FIG. 1D, I/O cards 174*a-b* and 176*a-b* (which perform substantially the same functions as the I/O cards 132*a-b* and 134*a-b* of FIG. 1A) are implemented in a workstation 172 (which performs substantially the same functions as the workstation 102 of FIG. 1A). In some example implementations, the physical I/O cards 174*a-b* and 176*a-b* are not included in the workstation 172, but the functionality of the I/O cards 174*a-b* and 176*a-b* are implemented in the workstation 172. In the illustrated example of FIG. 1D, the I/O cards 174*a-b* and 176*a-b* are configured to be communicatively coupled to the universal I/O buses 136*a-b* to exchange information with the termination modules 124*a-c* and 126*a-c*. Also, in the illustrated example of FIG. 1D, the workstation 172 may be configured to perform substantially the same functions as the controller 104 so that a controller need not be provided to perform a process control strategy. However, a controller may be provided.

Figure 2:
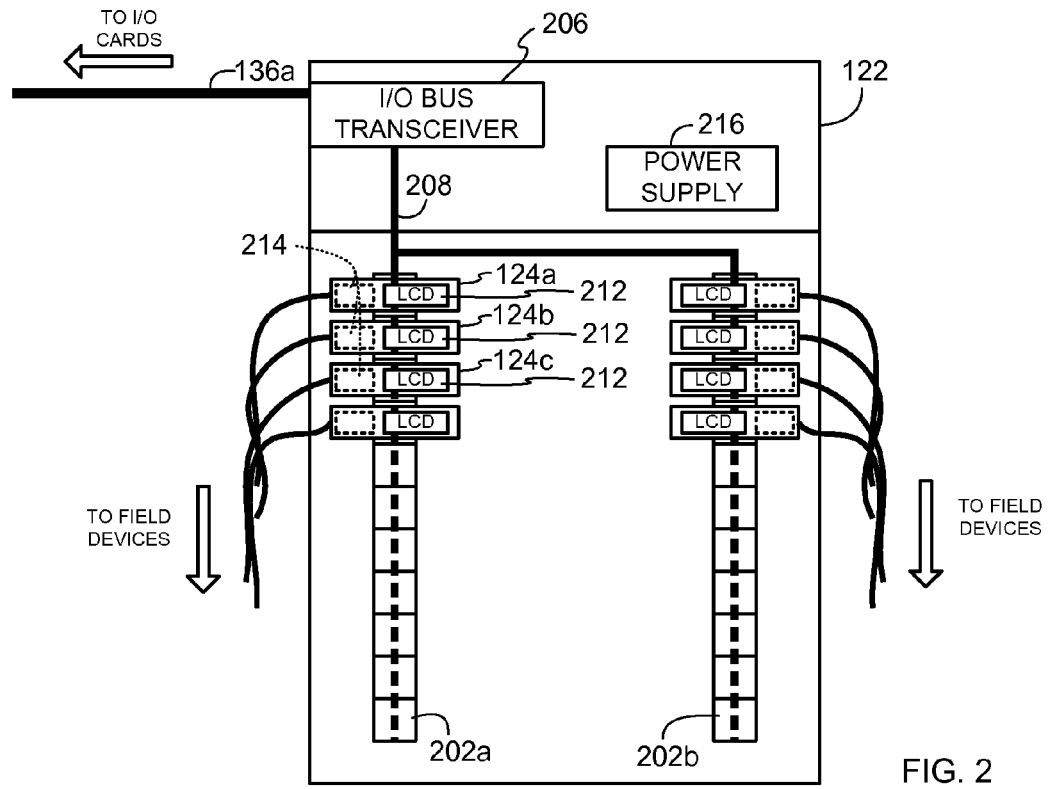
FIG. 2 is a detailed diagram of the example marshalling cabinet of FIG. 1A.

FIG. 2 is a detailed diagram of the example marshalling cabinet 122 of FIG. 1A. In the illustrated example, the marshalling cabinet 122 is provided with socket rails 202*a* and 202*b* to receive the termination modules 124*a-c*. In addition, the marshalling cabinet 122 is provided with an I/O bus transceiver 206 that communicatively couples the termination modules 124*a-c* to the universal I/O bus 136*a* described above in connection with FIG. 1A. The I/O bus transceiver 206 may be implemented using a transmitter amplifier and a receiver amplifier that conditions signals exchanged between the termination modules 124*a-c* and the I/O cards 132*a-b*. The marshalling cabinet 122 is provided with another universal I/O bus 208 communicatively coupling the terminal modules 124*a-c* to the I/O bus transceiver 206. In the illustrated example, the I/O bus transceiver 206 is configured to communicate information using a wired communication medium. Although not shown, the marshalling cabinet 122 may be provided with another I/O bus transceiver substantially similar or identical to the I/O bus transceiver 206 to communicatively couple the termination modules 126*a-c* with the I/O cards 134*a-b*.

Using a common communication interface (e.g., the I/O bus 208 and the I/O bus 136*a*) to exchange information between the I/O cards 132*a-b* and the termination modules 124*a-c* enables defining field device-to-I/O card connection routing late in a design or installation process. For example, the termination modules 124*a-c* can be communicatively coupled to the I/O bus 208 at various locations (e.g., various termination module sockets of the socket rails 202*a-b*) within the marshalling cabinet 122. In addition, the common communication interface (e.g., the I/O bus 208 and the I/O bus 136*a*) between the I/O cards 132*a-b* and the termination modules 124*a-c* reduces the number of communication media (e.g., the number of communication buses and/or wires) between the I/O cards 132*a-b* and the termination modules 124*a-c*, thus enabling installation of relatively more of the termination modules 124*a-c* (and/or the termination modules 126*a-c*) in the marshalling cabinet 122 than the number of known termination modules that can be installed in known marshalling cabinet configurations.

To display field device identification information and/or other field device information in association with the termination modules 124*a-c*, each of the termination modules 124*a-c* is provided with a display 212 (e.g., an electronic termination label). The display 212 of the termination module 124*a* displays the field device identification (e.g., a field device tag) of the field device 112*a* (FIG. 1A). In addition, the display 212 of the termination module 124*a* can be used to display field device activity information (e.g., measurement information, line voltages, etc.), data type information (e.g., analog signal, digital signal, etc.), field device status information (e.g., device on, device off, device error, etc.), and/or any other field device information. If the termination module 124*a* is configured to be communicatively coupled to a plurality of field devices (e.g., the field device 112*a* of FIG. 1A and other field devices (not shown)), the display 212 can be used to display field device information associated with all of the field devices communicatively coupled to the termination module 124. In the illustrated example, the displays 212 are implemented using liquid crystal displays (LCD's). However, in other example implementations, the displays 212 can be implemented using any other suitable display technology.

To retrieve the field device identification information and/or other field device information, each of the termination modules 124*a-c* is provided with a labeler 214 (e.g., a termination labeler). For example, when the field device 112*a* is communicatively coupled to the termination module 124*a*, the labeler 214 of the termination module 124*a* retrieves the field device identification information and/or any other field device information from the field device 112a (and/or other field devices communicatively coupled to the termination module 124a) and displays the information via the display 212 of the termination module 124a. The labelers 214 are described in detail below in connection with FIG. 8. Providing the display 212 and the labeler 214 decreases the costs and installation time associated with manually attaching labels to wires and/or buses associated with termination modules and field devices. However, in some example implementations, manual wire labeling may also be used in connection with the display 212 and labeler 214. For example, the field devices 112a-c and 116a-c may be communicatively coupled to the I/O cards 132a-b and 134a-b relatively quickly by using the display 212 and the labeler 214 to determine which of the field devices 112a-c and 116a-c is connected to each of the termination modules 124a-c and 126a-c. Subsequently, after installation is complete, labels may optionally be added to the buses or wires extending between the termination modules 124a-c and 126a-c and the field devices 112a-c and 114a-c. The display 212 and the labeler 214 can also decrease costs and time associated with maintenance operations by configuring the display 212 and the labeler 214 to display status information (e.g., device error, device alarm, device on, device off, device disabled, etc.) to facilitate a trouble shooting processes.

To provide electrical power to the termination modules 124a-c, the I/O bus transceiver 206, and the displays 212, the marshalling cabinet 122 is provided with a power supply 216. In the illustrated example, the termination modules 124a-c use the electrical power from the power supply 216 to power communication channels or communication interfaces used to communicate with field devices (e.g., the field devices 112a-c of FIG. 1A) and/or to provide the field devices electrical power for operation.

Figure 3:
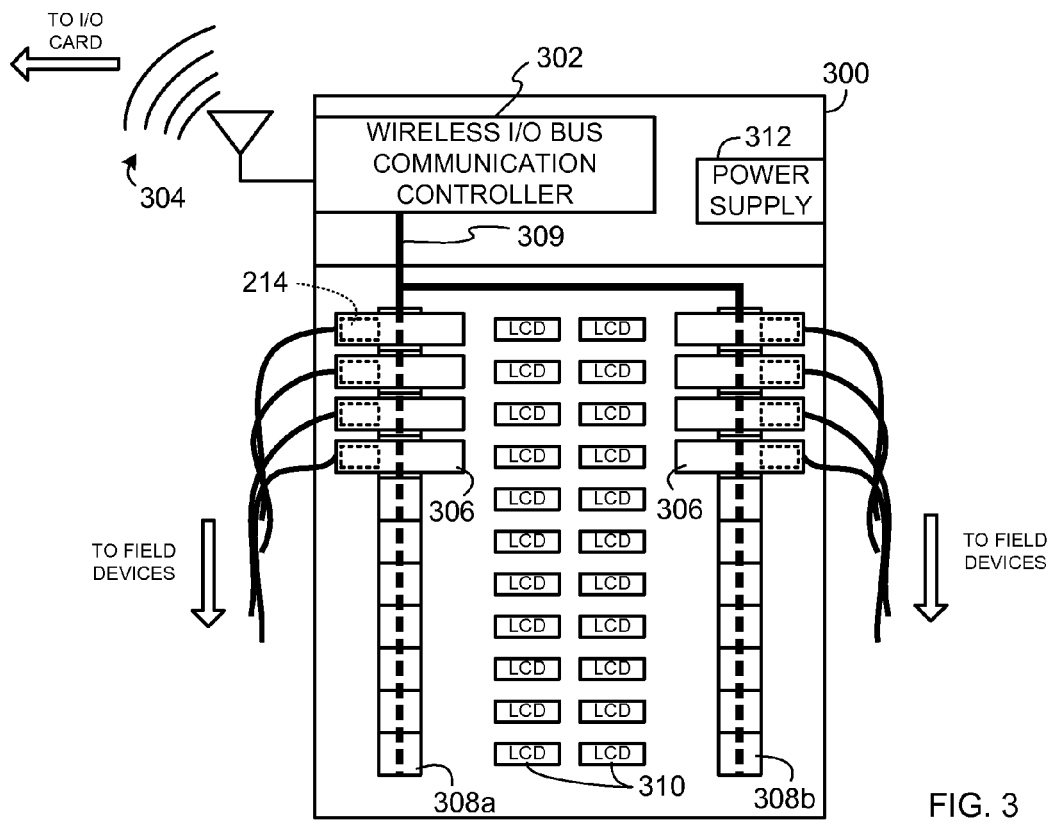
FIG. 3 is another example marshalling cabinet that may be used to implement the example marshalling cabinet of FIG. 1A.

FIG. 3 is another example marshalling cabinet 300 that may be used to implement the example marshalling cabinet 122 of FIG. 1A. In the illustrated example, the marshalling cabinet 300 is provided with a wireless I/O bus communication controller 302 to communicate with the controller 104 of FIG. 1A wirelessly via a wireless universal I/O connection 304. As shown in FIG. 3, a plurality of termination modules 306 substantially similar or identical to the termination modules 124a-c and 126a-c of FIG. 1A are plugged into rail sockets 308a and 308b and communicatively coupled to the wireless I/O bus communication controller 302 via a universal I/O bus 309 internal to the marshalling cabinet 300. In the illustrated example, the wireless I/O bus communication controller 302 emulates an I/O card (e.g., the I/O card 134a of FIG. 1A) of the controller 104 of FIG. 1A to enable the termination modules 306 to communicate with the controller 104.

Unlike the illustrated example of FIG. 2 in which the displays 212 are mounted on the termination modules 124a-c, in the illustrated example of FIG. 3, a plurality of displays 310 are mounted in the marshalling cabinet 300 in association with sockets to receive termination modules. In this manner, when one of the termination modules 306 is plugged in and communicatively coupled to a field device (e.g., one of the field devices 112a-c and 116a-c of FIG. 1A), a labeler 214 of the termination module 306 and a respective one of the displays 310 can be used to display the field device identification information indicative of the field device connected to the termination module 306. The displays 310 can also be used to display any other field device information. The marshalling cabinet 300 is provided with a power supply 312 that is substantially similar or identical to the power supply 216 of FIG. 2.

Figure 4:
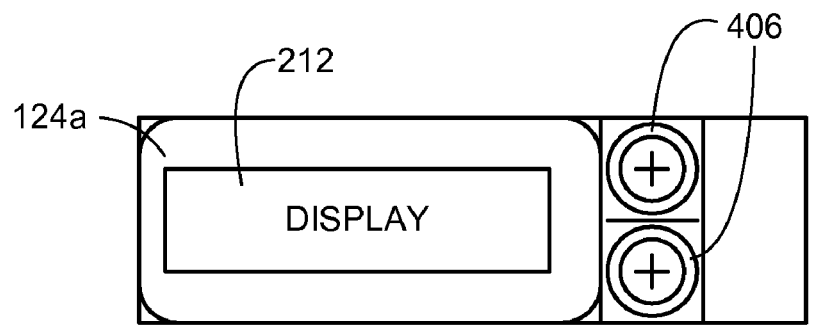
FIG. 4 depicts a top view and FIG. 5 depicts a side view of an example termination module of FIGS. 1A and 2.
Figure 5:
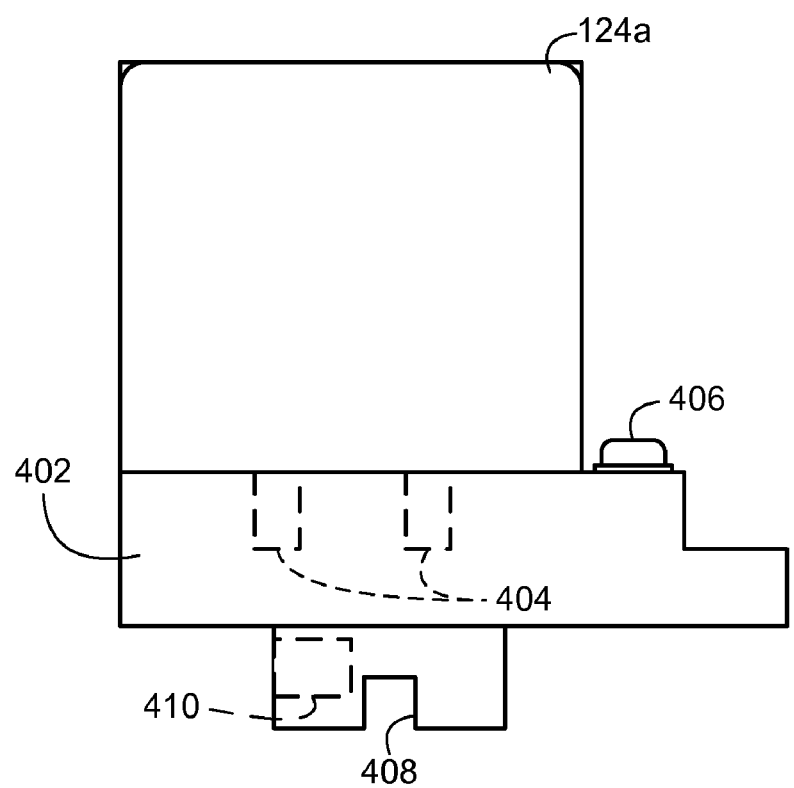

FIG. 4 depicts a top view and FIG. 5 depicts a side view of the example termination module 124a of FIGS. 1A and 2. In the illustrated example of FIG. 4, the display 212 is on a top surface of the example termination module 124a so that the display 212 is visible to an operator or user during operation when the termination module 124a is plugged into the rail socket 202a (FIG. 3). As shown in the illustrated example of FIG. 5, the example termination module 124a is removably coupled to a base 402. The example termination module 124a includes a plurality of contacts 404 (two of which are shown) that communicatively couple and/or electrically couple the termination module 124a to the base 402. In this manner, the base 402 can be coupled to the marshalling cabinet 122 (FIGS. 1A and 2), and the termination module 124a can be coupled to and removed from the marshalling cabinet 122 via the base 402. The base 402 is provided with termination screws 406 (e.g., a field device interface) to tie down or secure conductive communication media (e.g., a bus) from the field device 112a. When the termination module 124a is removably coupled to the base 402, the termination screws 406 are communicatively coupled to one or more of the contacts 404 to enable communicating information between the termination module 124a and the field device 112a. In other example implementations, the base 402 may be provided with any other suitable type of field device interface (e.g., a socket) instead of the termination screws 406. In addition, although one field device interface (e.g., the termination screws 406) is shown, the base 402 may be provided with more field device interfaces configured to enable communicatively coupling a plurality of field devices to the termination module 124a.

To communicatively couple the termination module 124a to the universal I/O bus 208 of FIG. 2, the base 402 is provided with a universal I/O bus connector 408 (FIG. 5). When a user plugs the base 402 into the socket rail 202a or the socket rail 202b (FIG. 2), the universal I/O bus connector 408 engages the universal I/O bus 208. The universal I/O bus connector 408 may be implemented using any suitable interface including a relatively simple interface such as, for example, an insulation piercing connector. To enable communicating information between the termination module 124a and the I/O bus 208, the I/O bus connector 408 is connected to one or more of the contacts 404 of the termination module 124a.

As shown in FIG. 5, the base 402 may also be provided with an optional display interface connector 410 to communicatively couple the termination module 124a to an external display (e.g., one of the displays 310 of FIG. 3). For example, if the termination module 124a is implemented without the display 212, the termination module 124a can use the display interface connector 410 to output field device identification information or any other field device information to an external display (e.g., one of the displays 310 of FIG. 3).

Figure 6:
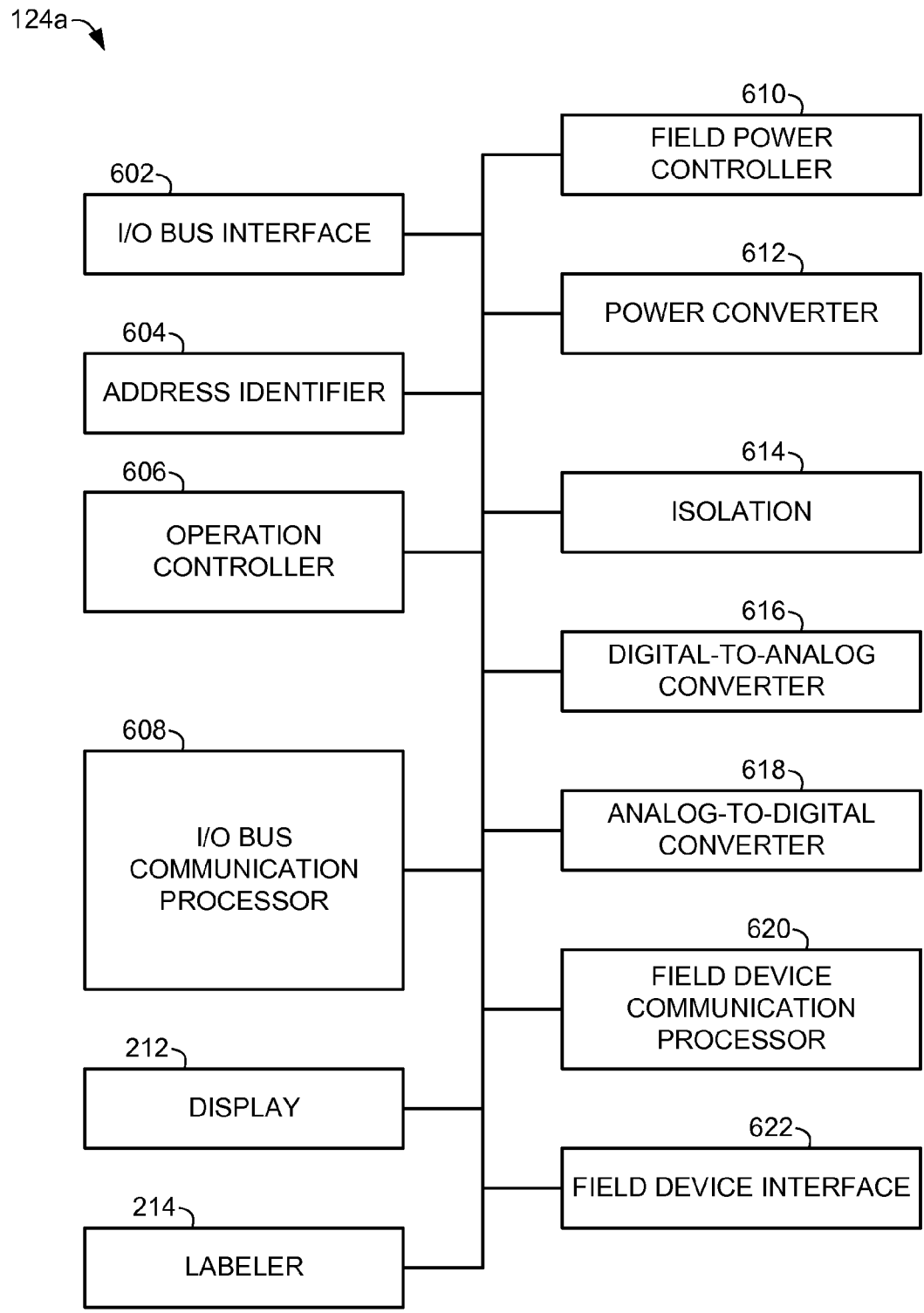
FIG. 6 is a detailed block diagram of the example termination module of FIGS. 1A, 2, 4, and 5.
Figure 7:
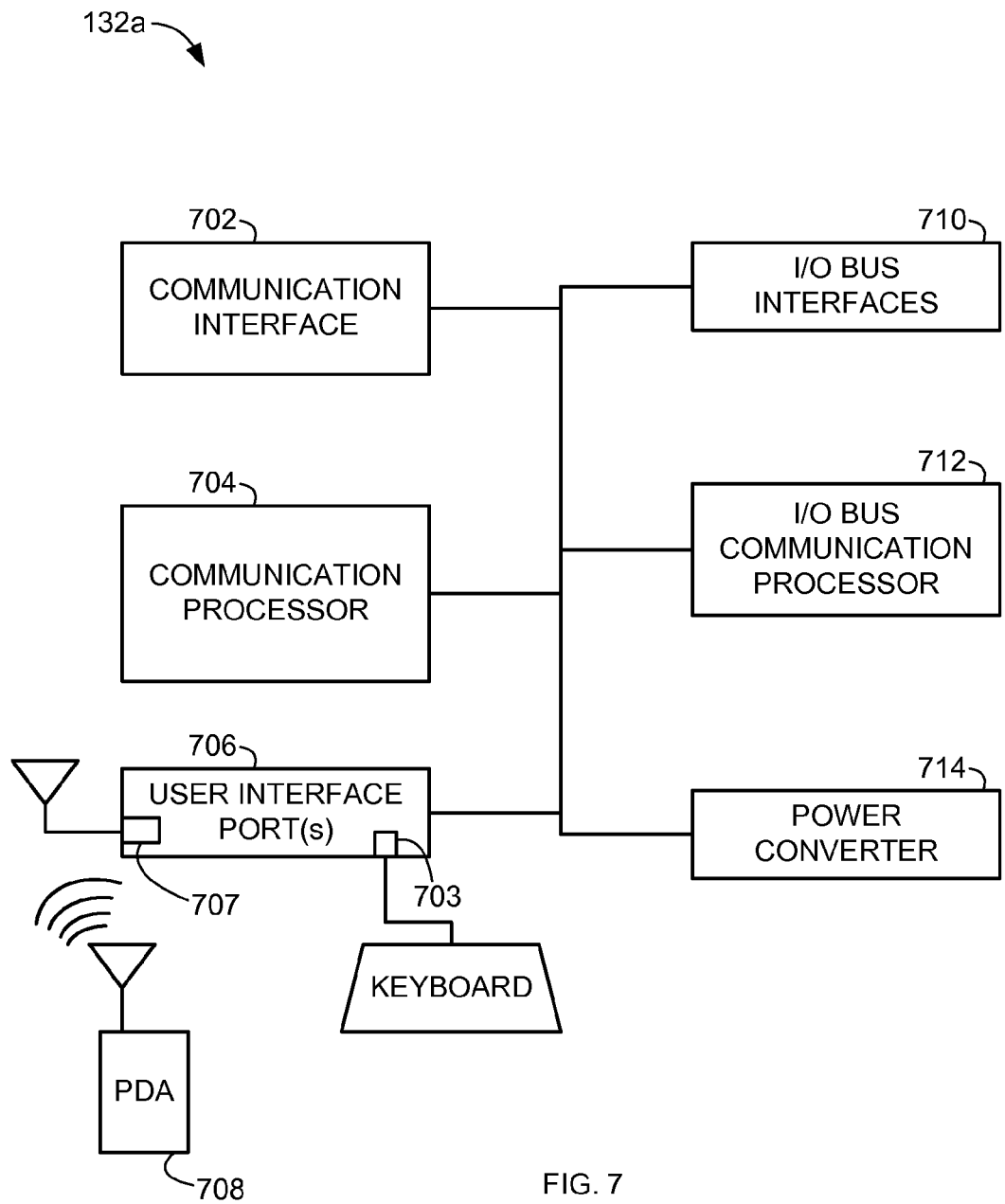
FIG. 7 is a detailed block diagram of an example I/O card of FIG. 1A.
Figure 8:
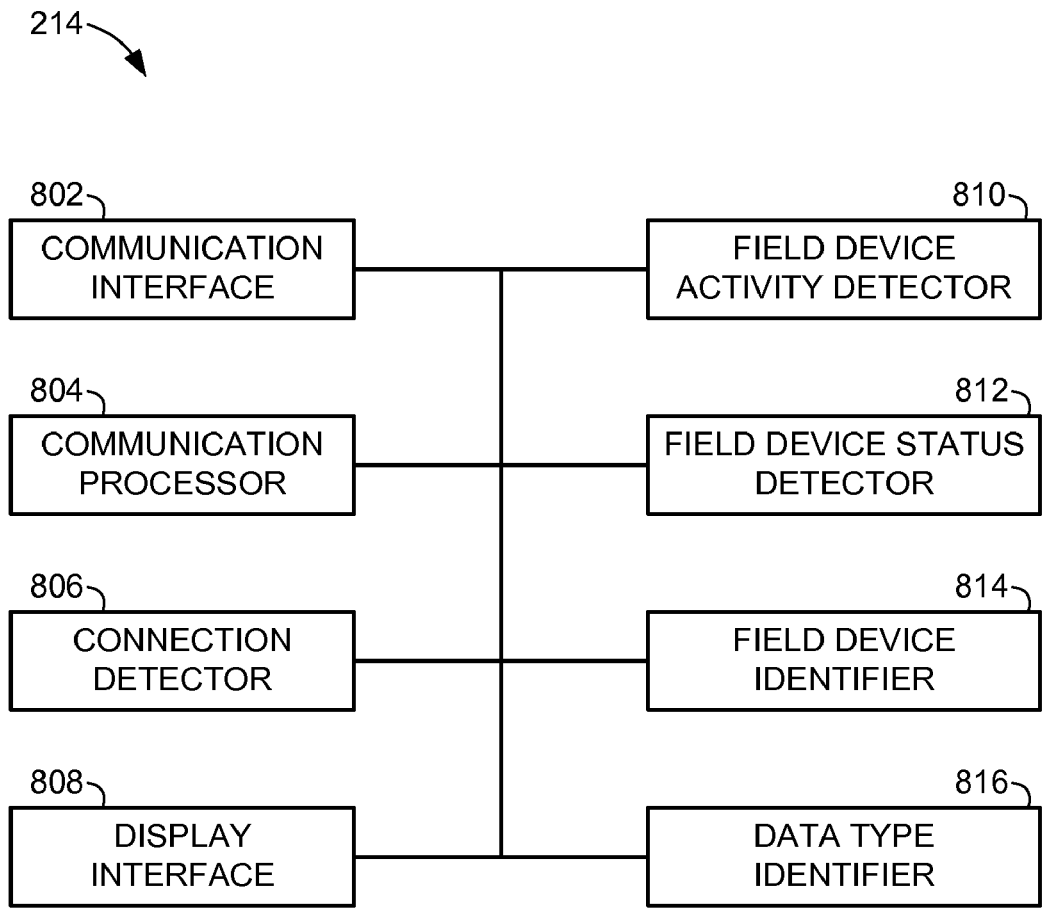
FIG. 8 is a detailed block diagram of an example labeler that may be used to display field device identification information and/or any other field device information in association with the termination modules of FIGS. 1A and 2-6.

FIG. 6 is a detailed block diagram of the example termination module 124a of FIGS. 1A and 2, FIG. 7 is a detailed block diagram of the example I/O card 132a of FIG. 1A, and FIG. 8 is a detailed block diagram of the example labeler 214 of FIGS. 2, 3, and 6. The example termination module 124a, the example I/O card 132a and the example labeler 214 may be implemented using any desired combination of hardware, firmware, and/or software. For example, one or more integrated circuits, discrete semiconductor components, or passive electronic components may be used. Additionally or alternatively, some or all of the blocks of the example termination module 124a, the example I/O card 132a and the example labeler 214, or parts thereof, may be implemented using instructions, code, and/or other software and/or firmware, etc. stored on a machine accessible medium that, when executed by, for example, a processor system (e.g., the example processor system 1310 of FIG. 13), perform the operations represented in the flowcharts of FIGS. 10A, 10B, 11A, 11B, and 12. Although the example termination module 124a, the example I/O card 132a and the example labeler 214 are described as having one of each block described below, each of the example termination module 124a, the example I/O card 132a and the example labeler 214 may be provided with two or more of any respective block described below.

Turning to FIG. 6, the example termination module 124a includes a universal I/O bus interface 602 to enable the example termination module 124a to communicate with the I/O cards 132a-b of FIG. 1A (or with any other I/O cards). The I/O bus interface 602 may be implemented using, for example, the RS-485 serial communication standard, Ethernet, etc. To identify an address of the termination module 124a and/or an address of the I/O card 132a, the termination module 124a is provided with an address identifier 604. The address identifier 604 may be configured to query the I/O card 132a (FIG. 1A) for a termination module address (e.g., a network address) when the termination module 124a is plugged into the marshalling cabinet 122. In this manner, the termination module 124a can use the termination module address as a source address when communicating information to the I/O card 132a and the I/O card 132a uses the termination module address as a destination address when communicating information to the termination module 124a.

To control the various operations of the termination module 124a, the termination module 124a is provided with an operation controller 606. In an example implementation, the operation controller can be implemented using a microprocessor or a microcontroller. The operation controller 606 communicates instructions or commands to other portions of the example termination module 124a to control the operations of those portions.

The example termination module 124a is provided with an I/O bus communication processor 608 to exchange information with the I/O card 132a via the universal I/O bus 136a. In the illustrated example, the I/O bus communication processor 608 packetizes information for transmission to the I/O card 132a and depacketizes information received from the I/O card 132a. In the illustrated example, the I/O bus communication processor 608 generates header information for each packet to be transmitted and reads header information from received packets. Example header information includes a destination address (e.g., the network address of the I/O card 132a), a source address (e.g., the network address of the termination module 124a), a packet type or data type (e.g., analog field device information, field device information, command information, temperature information, real-time data values, etc.), and error checking information (e.g., cyclical-redundancy-check (CRC)). In some example implementations, the I/O bus communication processor 608 and the operation controller 606 may be implemented using the same microprocessor or microcontroller.

To provide (e.g., obtain and/or generate) field device identification information and/or any other field device information (e.g., activity information, data type information, status information, etc.), the termination module 124a is provided with the labeler 214 (FIGS. 2 and 3). The labeler 214 is described in detail below in connection with FIG. 8. The termination module 124a also includes the display 212 (FIG. 2) to display the field device identification information and/or any other field device information provided by the labeler 214.

To control the amount of power provided to the field device 112a of FIG. 1A (or any other field device), the termination module 124a is provided with a field power controller 610. In the illustrated example, the power supply 216 in the marshalling cabinet 122 (FIG. 2) provides electrical power to the termination module 124a to power a communication channel interface to communicate with the field device 112a. For example, some field devices communicate using 12 volts and others communicate using 24 volts. In the illustrated example, the field power controller 610 is configured to condition, regulate, and step up and/or step down the electrical power provided to the termination module 124a by the power supply 216. In some example implementations, the field power controller 610 is configured to limit the amount of electrical power used to communicate with the field devices and/or delivered to the field devices to substantially reduce or eliminate the risk of sparking in flammable or combustible environments.

To convert electrical power received from the power supply 216 (FIG. 2) to electrical power for the termination module 124a and/or the field device 112a, the termination module 124a is provided with a power converter 612. In the illustrated example, the circuitry used to implement the termination module 124a uses one or more voltage levels (e.g., 3.3 V) that are different from the voltage levels required by the field device 112a. The power converter 612 is configured to provide the different voltage levels for the termination module 124a and the field device 112a using the power received from the power supply 216. In the illustrated example, the electrical power outputs generated by the power converter 612 are used to power up the termination module 124a and the field device 112a and to communicate information between the termination module 124a and the field device 112a. Some field device communication protocols require relatively higher or lower voltage levels and/or electrical current levels than other communication protocols. In the illustrated example, the field power controller 610 controls the power converter 612 to provide the voltage level(s) to power up the field device 112a and to communicate with the field device 112a. However, in other example implementations, the electrical power outputs generated by the power converter 612 may be used to power up the termination module 124a while a separate power supply external to the marshalling cabinet 122 is used to power up the field device 112a.

To electrically isolate the circuitry of the termination module 124a from the I/O card 132a, the termination module 124a is provided with one or more isolation devices 614. The isolation devices 614 may be implemented using galvanic isolators and/or optical isolators. An example isolation configuration is described in detail below in connection with FIG. 9.

To convert between analog and digital signals, the termination module 124a is provided with a digital-to-analog converter 616 and an analog-to-digital converter 618. The digital-to-analog converter 616 is configured to convert digitally represented analog values received from the I/O card 132a to analog values that can be communicated to the field device 112a of FIG. 1A. The analog-to-digital converter 618 is configured to convert analog values (e.g., measurement values) received from the field device 112a to digitally represented values that can be communicated to the I/O card 132a. In an alternative example implementation in which the termination module 124a is configured to communicate digitally with the field device 112a, the digital-to-analog converter 616 and the analog-to-digital converter 618 can be omitted from the termination module 124a.

To control communications with the field device 112a, the termination module 124a is provided with a field device communication processor 620. The field device communication processor 620 ensures that information received from the I/O card 132a is in the correct format and voltage type (e.g., analog or digital) to be communicated to the field device 112a. The field device communication processor 620 is also configured to packetize or depacketize information if the field device 112a is configured to communicate using digital information. In addition, the field device communication processor 620 is configured to extract information received from the field device 112a and communicate the information to the analog-to-digital converter 618 and/or to the I/O bus communication processor 608 for subsequent communication to the I/O card 132a. In the illustrated example, the field device communication processor 620 is also configured to timestamp information received from the field device 112a. Generating timestamps at the termination module 124a facilitates implementing sequence of events (SOE) operations using timestamp accuracies in the sub-millisecond range. For example, the timestamps and respective information can be communicated to the controller 104 and/or the workstation 102. Sequence of events operations performed by, for example, the workstation 102 (FIG. 1A) (or any other processor system) can then be used to analyze what happened before, during, and/or after a particular state of operation (e.g., a failure mode) to determine what caused the particular state of operation to occur. Timestamping in the sub-millisecond range enables capturing events using relatively higher granularity. In some example implementations, the field device communication processor and the operation controller 606 can be implemented using the same microprocessor or microcontroller.

In general, field device communication controllers similar to the field device communication controller 620 are provided with communication protocol functions or other communication functions (e.g., Fieldbus communication protocol functions, HART communication protocol functions, etc.) corresponding to the type of field device with which they are configured to communicate. For example, if the field device 112a is implemented using a HART device, the field device communication controller 620 of the termination module 124a is provided with HART communication protocol functions. When the termination module 124a receives information from the I/O card 132a intended for the field device 112a, the field device communication controller 620 formats the information in accordance with the HART communication protocol and delivers the information to the field device 112a.

In the illustrated example, the field device communication controller 620 is configured to process pass-through messages. Pass-through messages originate at a workstation (e.g., the workstation 102 of FIG. 1A) and are communicated as payload (e.g., the data portion of a communication packet) through a controller (e.g., the controller 104 of FIG. 1A) and to a termination module (e.g., the termination module 124a of FIG. 1A) for delivery to a field device (e.g., the field device 112a). For example, a message originating at the workstation 102 and intended to be delivered to the field device 112a is tagged at the workstation 102 with a communication protocol descriptor (e.g., a HART protocol descriptor) and/or is formatted in accordance with a communication protocol of the field device 112a. The workstation 102 then wraps the message into a payload(s) of one or more communication packets to deliver the message from the workstation 102, through the I/O controller 104, and to the termination module 124a as a pass-through message. Wrapping the message involves, for example, packetizing the message within header information in accordance with a communication protocol (e.g., a Fieldbus protocol, a HART protocol, etc.) used to communicate with the field devices. When the termination module 124a receives the communication packet(s) containing the pass-through message from the I/O card 132, the I/O bus communication processor 608 (FIG. 6) extracts the payload(s) from the received communication packet(s). The field device communication controller 620 (FIG. 6) then unwraps the pass-through message from the payload(s), formats the message in accordance with the communication protocol descriptor generated by the workstation 102 (if not already formatted at the workstation 102), and communicates the message to the field device 112a.

The field device communication controller 620 is also configured to communicate pass-through messages to the workstation 102 in a similar manner. For example, if the field device 112a generates a message (e.g., a response to the workstation message or any other message) intended to be delivered to the workstation 102, the field device communication controller 620 wraps the message from the field device 112a into the payload of one or more communication packets and the I/O bus communication processor 608 communicates the one or more packets containing the wrapped message to the I/O card 132a. When the workstation 102 receives the packets from the controller 104 containing the wrapped message, the workstation 102 can unwrap and process the message.

The termination module 124a is provided with a field device interface 622 configured to communicatively couple the termination module 124a to a field device (e.g., the field device 112a of FIG. 1A). For example, the field device interface 622 may be communicatively coupled to the termination screws 406 of FIGS. 4 and 5 via one or more of the contacts 404 (FIG. 4).

Turning now to FIG. 7, the example I/O card 132a of FIG. 1A includes a communication interface 702 to communicatively couple the I/O card 132a to the controller 104 (FIG. 1A). In addition, the example I/O card 132a includes a communication processor 704 to control communications with the controller 104 and to pack and unpack information exchanged with the controller 104. In the illustrated example, the communication interface 702 and the communication processor 704 are configured to communicate to the controller 104 information intended to be delivered to the controller 104 and information to be delivered to the workstation 102 (FIG. 1A). To communicate information intended to be delivered to the workstation 102, the communication interface 702 may be configured to wrap the information (e.g., information from the field devices 112a-c, the termination modules 124a-c, and/or the I/O card 132a) in the payload of one or more communication packet(s) in accordance with a communication protocol (e.g., a transmission control protocol (TCP), a user datagram protocol (UDP), etc.) and to communicate the packets containing the information to the workstation 102. The workstation 102 can then unpack the payload(s) from the received packet(s) and unwrap the information in the payload (s). In the illustrated example, the information in the payload of packets communicated by the communication interface 702 to the workstation 102 may contain one or more wrappers. For example, information originating at a field device (e.g., the field device 112a) may be wrapped in a field device communication protocol wrapper (e.g., a FOUNDATION Fieldbus communication protocol wrapper, a HART communication protocol wrapper, etc.), which the communication interface 702 wraps in accordance with a TCP-based protocol, a UDP-based protocol, or any other protocol to enable the controller 104 to subsequently communicate the information to the workstation 102. In a similar manner, the communication interface 702 may be configured to unwrap information communicated by the workstation 102 to the controller 104 and intended for delivery to the field devices 112a-c, the termination modules 124a-c, and/or the I/O card 132a.

In an alternative example implementation, the communication interface 702 and the communication processor 704 can communicate information (with or without a field device communication protocol wrapper) to the controller 104 and the controller 104 can packetize information intended to be delivered to the workstation 102 in the same manner as described above. The communication interface 702 and the communication processor 704 may be implemented using any wired or wireless communication standard.

In an alternative example implementation such as, for example, the illustrated example of FIG. 1C, the communication interface 702 and the communication processor 704 may be configured to communicate with the workstation 102 and/or the controller 162 via the LAN 106.

To enable users to interact with and/or access the I/O card 132a, the I/O card 132a is provided with one or more user interface ports 706. In the illustrated example, the user interface ports 706 include a keyboard interface port 703 and a portable handheld computer (e.g., a personal digital assistant (PDA), a tablet PC, etc.) interface port 707. For example, a PDA 708 is shown communicatively coupled to the user interface port 706 using wireless communications.

To communicatively couple the I/O card 132a to the universal I/O bus 136a (FIG. 1A), the I/O card 132a is provided with an I/O bus interface 710. To process communication information exchanged via the I/O bus 136a and to control communications made via the I/O bus 136a, the I/O card 132a is provided with an I/O bus communication processor 712. The I/O bus interface 710 may be similar or identical to the I/O bus interface 602 of FIG. 6 and the I/O bus communication processor 712 may be similar or identical to the I/O bus communication processor 608 of FIG. 6. To convert electrical power provided by the controller 104 of FIG. 1A to electrical power needed to power and operate the I/O card 132a and/or to communicate with the termination modules 124a-c, the I/O card 132a is provided with a power converter 714.

Turning now to FIG. 8, the example labeler 214 includes a communication interface 802 configured to communicatively couple the labeler 214 to a termination module (e.g., the termination module 124a of FIGS. 1A, 2, 4, 5, and 6) and/or a field device (e.g., the field device 112a of FIG. 1A) to retrieve field device identification information (e.g., a device tag value, a device name, an electronic serial number, etc.) and/or other field device information (e.g., activity information, data type information, status information, etc.). To control communications with the termination module 124a and/or the field device 112a, the labeler 214 is provided with a communication processor 804.

To detect a connection to a field device (e.g., the field device 112a of FIG. 1A), the labeler 214 is provided with a connection detector 806. The connection detector 806 may be implemented using, for example, a voltage sensor, a current sensor, a logic circuit, etc. that senses when the field device 112a has been connected to the termination module 124a. In the illustrated example, when the connection detector 806 determines that the field device 112a has been connected to the termination module 124a, the connection detector 806 causes a notification (e.g., an interrupt) to be communicated to the communication processor 804 indicating the detected connection. The communication processor 804 then queries the termination module 124a and/or the field device 112a for the field device identification information of the field device 112a. In an example implementation, the connection detector 802 can also be configured to determine the type of connection that communicatively couples the field device 112a to the termination module 124a such as, for example, a multi-drop connection, a point-to-point connection, a wireless mesh network connection, an optical connection, etc.

To display the field device identification information and/or other field device information, the labeler 214 is provided with a display interface 808. In the illustrated example, the display interface 808 is configured to drive and control a liquid crystal display (LCD). For example, the display interface 808 may be configured to control the LCD display 212 (FIG. 2) mounted on the termination module 124a or the LCD display 310 mounted on the marshalling cabinet 300 (FIG. 3). However, in other example implementations, the display interface 808 may instead be configured to drive other display types.

To detect the activity of the field device 112a, the labeler 214 is provided with a field device activity detector 810. In the illustrated example, when the communication processor 804 receives data from the termination module 124a and/or the field device 112a, the communication processor 804 communicates the received data to the field device activity detector 810. The field device activity detector 810 then extracts process variable (PV) values from the data including, for example, measurement information (e.g., temperature, pressure, line voltages, etc.) or other monitoring information (e.g., valve closed, valve open, etc.) generated by the field device 112a. The display interface 808 can then display the field device activity information (e.g., the PV values, measurement information, monitoring information, etc.).

To detect the status of the field device 112a, the labeler 214 is provided with a field device status detector 812. The field device status detector 812 is configured to extract status information (e.g., device on, device off, device error, device alarm, device health (open loop, short, etc.), device communication status, etc.) associated with the field device 112a from data received by the communication processor 804 from the termination module 124a and/or the field device 112a. The display interface 808 can then display the received status information.

To identify the field device 112a, the labeler 214 is provided with a field device identifier 814. The field device identifier 814 is configured to extract the field device identification information (e.g., a device tag value, a device name, an electronic serial number, etc.) from data received by the communication processor from the termination module 124a and/or the field device 112a. The display interface 808 can then display the field device identification information. In an example implementation, the field device identifier 814 may also be configured to detect the field device type (e.g., valve actuator, pressure sensor, temperature sensor, flow sensor, etc.).

To identify a data type (e.g., analog or digital) associated with the field device 112a, the labeler 214 is provided with a data type identifier 816. The data type identifier 816 is configured to extract the data type identification information from data received by the communication processor from the termination module 124a and/or the field device 112a. For example, the termination module 124a may store a data type descriptor variable that indicates the type of field device (e.g., analog, digital, etc.) with which it is configured to communicate, and the termination module 124a may communicate the data type descriptor variable to the communication processor 804 of the labeler 214. The display interface 808 can then display the data type.

Figure 9:
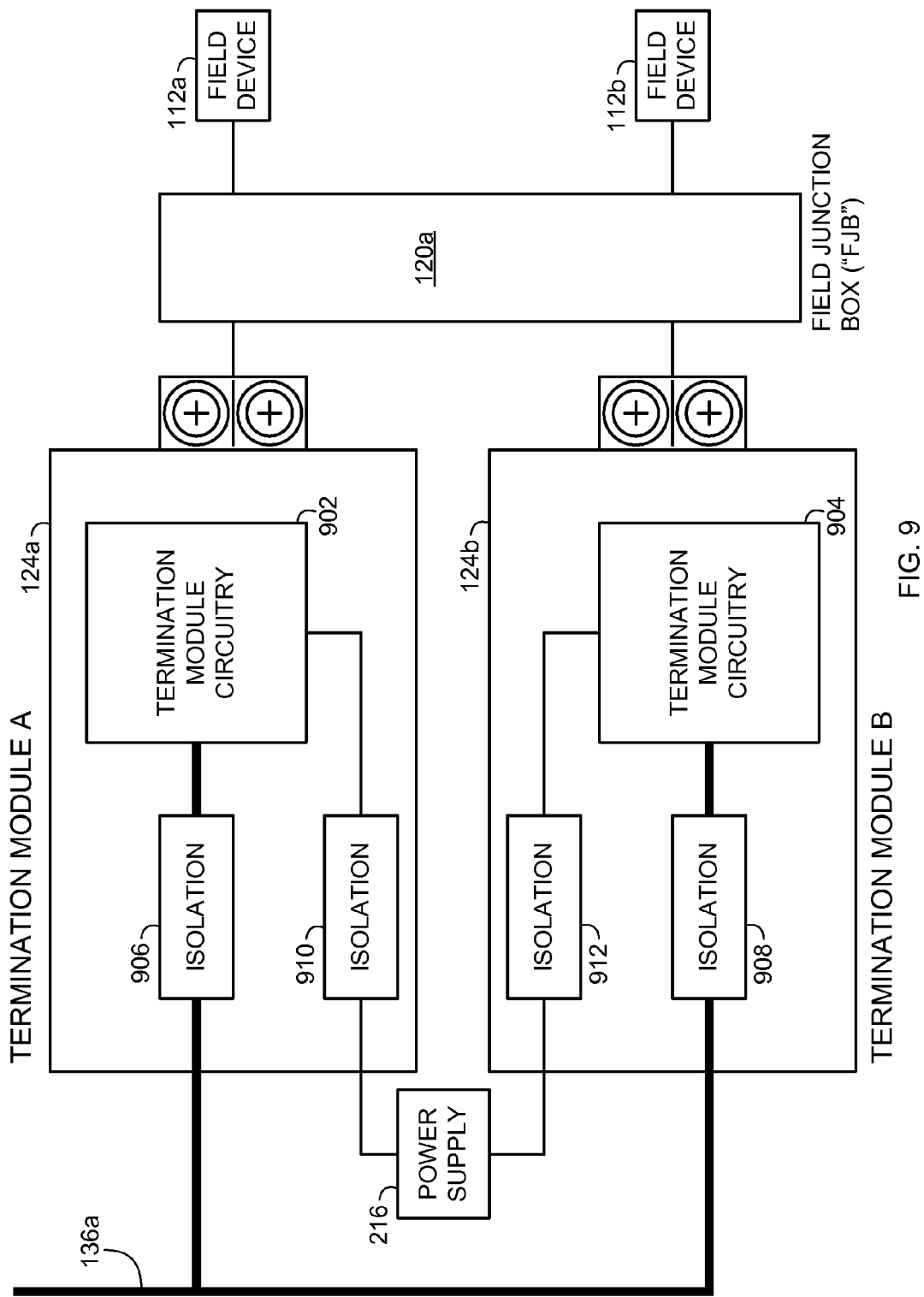
FIG. 9 depicts an isolation circuit configuration that may be implemented in connection with the example termination modules of FIG. 1A to electrically isolate the termination modules from one another, from field devices, and from communication buses.

FIG. 9 depicts an isolation circuit configuration that may be implemented in connection with the example termination modules 124a and 124b of FIG. 1A to electrically isolate the termination modules 124a-b from one another and the field devices 112a-b from the universal I/O bus 136a. In the illustrated example, each of the termination modules 124a-b includes respective termination module circuitry 902 and 904 (e.g., one or more of the blocks described above in connection with FIG. 6). In addition, the termination modules 124a-b are connected to their respective field devices 112a-b via the field junction box 120a. Also, the termination modules 124a-b are connected to the universal I/O bus 136a and the power supply 216. To electrically isolate the termination module circuitry 902 from the universal I/O bus 136a, the termination module 124a is provided with an isolation circuit 906. In this manner, the termination module circuitry 902 can be configured to follow (e.g., float) the voltage level of the field device 112a if power surges or other power variations occur in the field device 112a without affecting the voltage of the universal I/O bus 136a and without causing damage to the I/O card 132a (FIG. 1A). The termination module 124b also includes an isolation circuit 908 configured to isolate the termination module circuitry 904 from the universal I/O bus 136a. The isolation circuits 906 and 908 and any other isolation circuits implemented in the termination modules 124a-b may be implemented using optical isolation circuits or galvanic isolation circuits.

To isolate the termination module circuitry 902 from the power supply 216, the termination module 124a is provided with an isolation circuit 910. Similarly, the termination module 124b is provided with an isolation circuit 912 to isolate the termination module circuitry 904 from the power supply 216. By isolating the termination module circuitry 902 and 904 from the power supply 216, any power variation (e.g., power surges, current spikes, etc.) associated with the field devices 112a-b will not harm the power supply 216. Also, any power variations in one of the termination modules 124a-b will not harm or affect the operation of the other one of the termination modules 124a-b.

In known process control systems, isolation circuits are provided in known marshalling cabinets, thereby reducing the amount of space available for known termination modules. However, providing the isolation circuits 906, 910, 908, and 912 in the termination modules 124a and 124b as shown in the illustrated example of FIG. 9 reduces the amount of space required in the marshalling cabinet 122 (FIGS. 1A and 2) for isolation circuits, thus increasing the amount of space available for termination modules (e.g., the termination modules 124a-c and 126a-c). In addition, implementing isolation circuits (e.g., the isolation circuits 906, 908, 910, and 912) in termination modules (e.g., the termination modules 124a-b) enables selectively using isolation circuits only with termination modules that require isolation. For example, some of the termination modules 124a-c and 126a-c of FIG. 1A may be implemented without isolation circuits.

FIGS. 10A, 10B, 11A, 11B, and 12 are flowcharts of example methods that may be used to implement termination modules (e.g., the termination module 124a of FIGS. 1A, 2, and 4-6), I/O cards (e.g., the I/O card 132a of FIGS. 1A and 7), and labelers (e.g., the labeler 214 of FIGS. 2, 3, and 8). In some example implementations, the example methods of FIGS. 10A, 10B, 11A, 11B, and 12 may be implemented using machine readable instructions comprising a program for execution by a processor (e.g., the processor 1312 shown in the example processor system 1310 of FIG. 13). The program may be embodied in software stored on a tangible medium such as a CD-ROM, a floppy disk, a hard drive, a digital versatile disk (DVD), or a memory associated with the processor 1312 and/or embodied in firmware and/or dedicated hardware in a well-known manner. Further, although the example program is described with reference to the flowcharts illustrated in FIGS. 10A, 10B, 11A, 11B, and 12, persons of ordinary skill in the art will readily appreciate that many other methods of implementing the example termination module 124a, the example I/O card 132a, and the example labeler 214 described herein may alternatively be used. For example, the order of execution of the blocks may be changed, and/or some of the blocks described may be changed, eliminated, or combined.

Figure 10A:
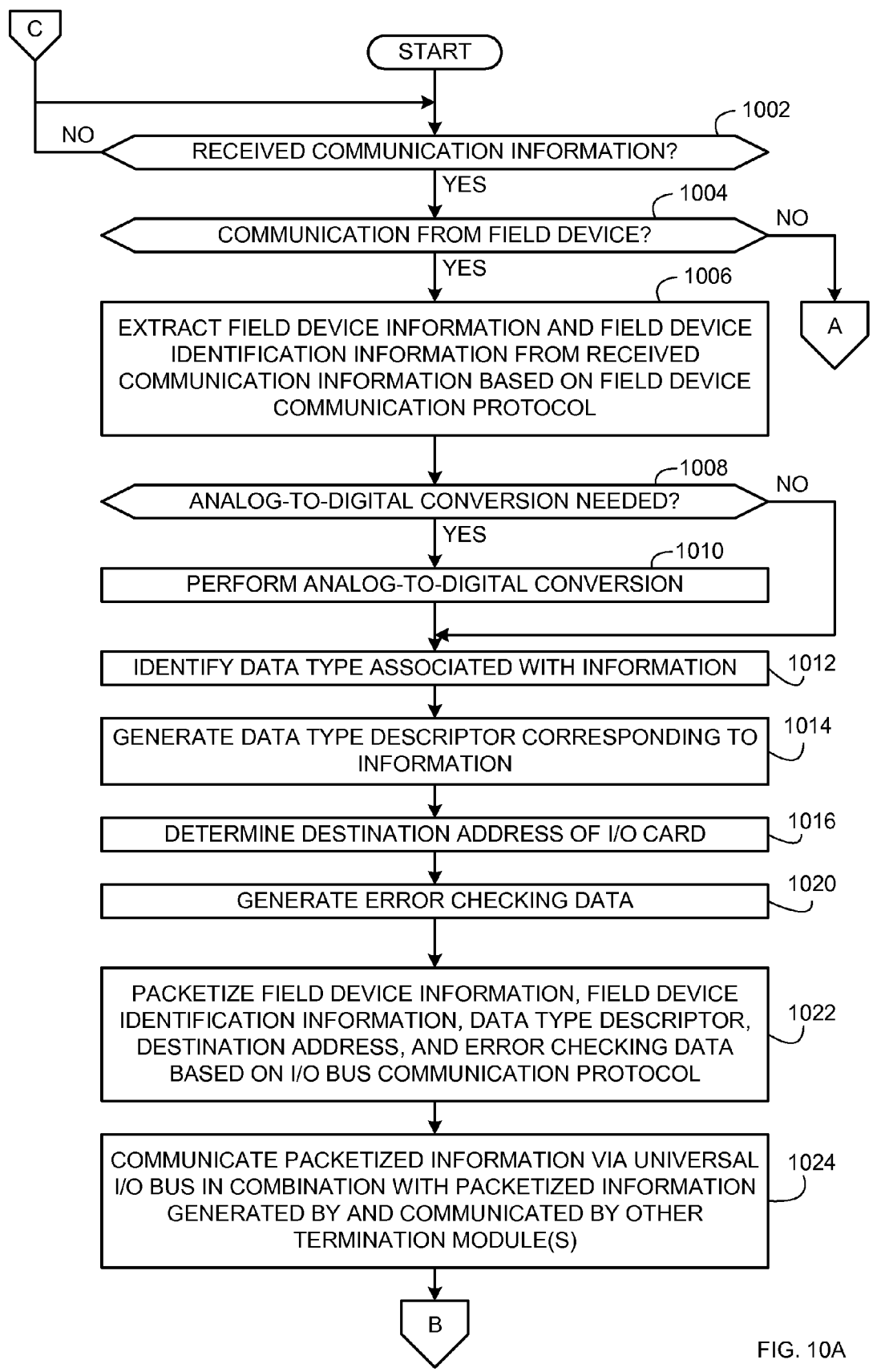
FIGS. 10A and 10B depict a flowchart of an example method that may be used to implement the termination modules of FIGS. 1A and 2-6 to communicate information between field devices and I/O cards.
Figure 10B:
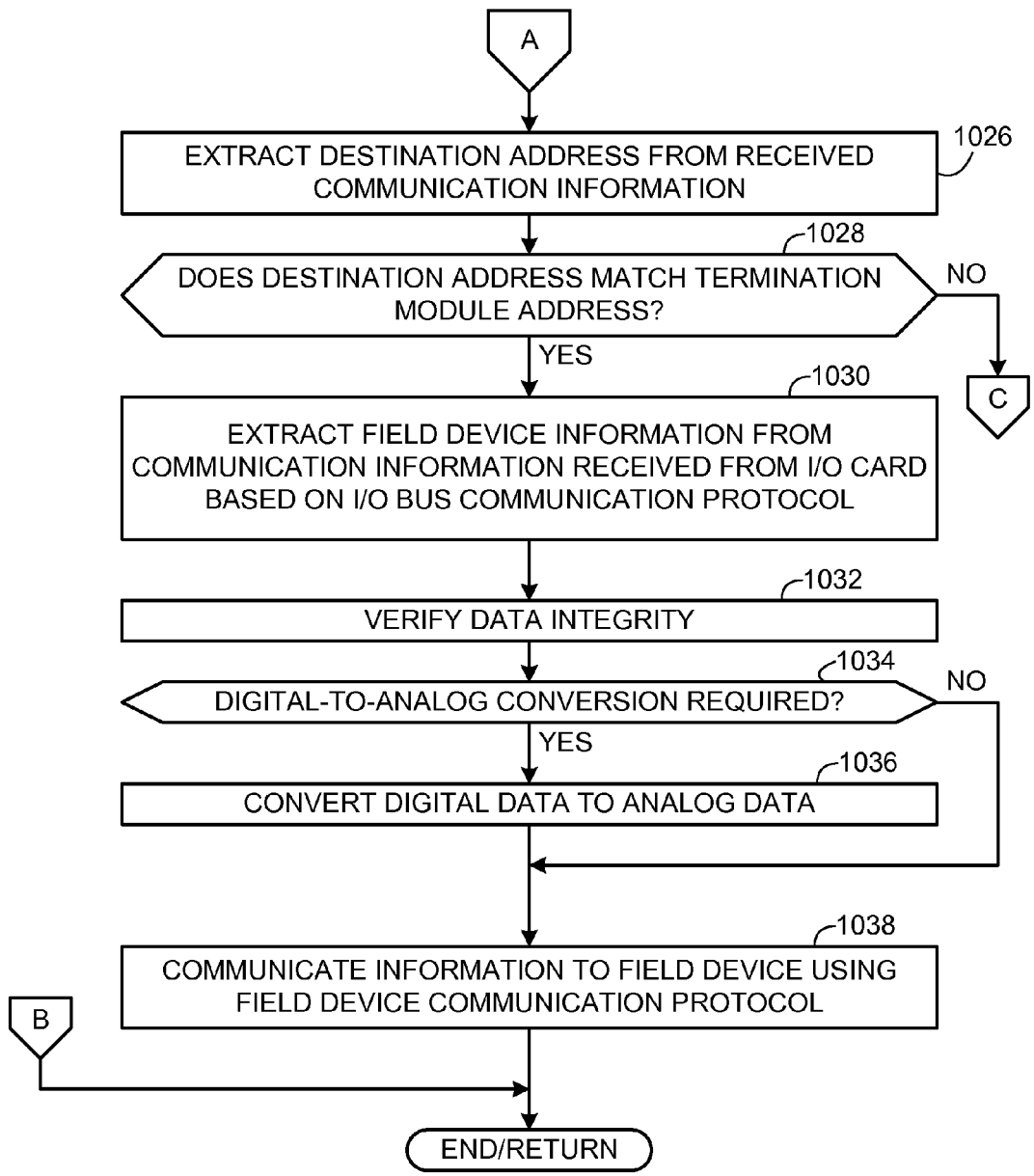

Turning in detail to FIGS. 10A and 10B, the example method of FIGS. 10A and 10B is described in connection with the example termination module 124a of FIGS. 1A, 2, and 4-6. However, the example method of FIGS. 10A and 10B may be used to implement any other termination module. The flowchart of FIGS. 10A and 10B is used to describe how the example termination module 124a communicates information between the field device 112a and the I/O card 132a. Initially, the termination module 124a determines whether it has received communication information (block 1002). For example, the termination module 124a determines that it has received communication information if the I/O bus communication processor 608 (FIG. 6) or the field device communication processor 620 indicates via, for example, an interrupt or a status register that communication information has been received. If the termination module 124a determines that it has not received communication information (block 1002), control remains at block 1002 until the termination module 124a receives communication information.

If the termination module 124a receives communication information (block 1002), the termination module 124a determines whether it received the communication information from a field device (e.g., the field device 112a of FIG. 1A) (block 1004) based on, for example, an interrupt or status register of the field device communication processor 620 (FIG. 6). If the termination module 124a determines that it has received communication information from the field device 112a (block 1004), then the field device communication processor 620 extracts the field device information and the field device identification information from the received communication information associated with the field device 112a based on a field device communication protocol (block 1006). The field device information may include, for example, field device identification information (e.g., device tags, electronic serial numbers, etc.), field device status information (e.g., communication status, diagnostic health information (open loop, short, etc.)), field device activity information (e.g., process variable (PV) values), field device description information (e.g., field device type or function such as, for example, valve actuator, temperature sensor, pressure sensor, flow sensor, etc.), field device connection configuration information (e.g., multi-drop bus connection, point-to-point connection, etc.), field device bus or segment identification information (e.g., field device bus or field device segment via which field device is communicatively coupled to termination module), and/or field device data type information (e.g., analog in (AI) data types, analog out (AO) data types, discrete in (DI) data types (e.g., digital in data types), discrete out (DO) data types (e.g., digital out data types), etc.). The field device communication protocol may be any protocol (e.g., a Fieldbus protocol, a HART protocol, an AS-I protocol, a Profibus protocol, etc.) used by the field device 112a. In an alternative example implementation, at block 1006, the field device communication processor 620 only extracts the field device information from the received communication information and the field device identification information identifying the field device 112a is stored in the termination module 124a. For example, when the field device 112a is initially connected to the termination module 124a, the field device 112a can communicate its identification information to the termination module 124a and the termination module 124a can store the identification information.

The field device communication processor 620 then determines whether an analog-to-digital conversion is needed (block 1008). For example, if the field device 112a communicates analog measurement values, the field device communication processor 620 determines that an analog to digital conversion is needed or required (block 1008). If an analog to digital conversion is required, the analog-to-digital converter 618 (FIG. 6) performs the conversion on the received information (block 1010).

After the analog-to-digital conversion (block 1010) or if no analog-to-digital conversion is required (block 1008), the field device communication processor 620 identifies the data type (e.g., analog, digital, temperature measurement, etc.) associated with the received field device information (block 1012) and generates a data type descriptor corresponding to the received field device information (block 1014). For example, the termination module 124a can store a data type descriptor that indicates the data type that it will always receive from the field device 112a or the field device 112a can communicate a data type to the termination module 124a that the field device communication processor 620 uses to generate the data type descriptor at block 1010.

The I/O bus communication processor 608 (FIG. 6) determines the destination address of the I/O card 132a (block 1016) to which the termination module 124a is to communicate the information received from the field device 124a. For example the communication processor 604 (FIG. 6) can obtain the destination address of the I/O card 132a from the address identifier 608 (FIG. 6). In addition, the I/O bus communication processor 608 determines or generates error checking data (block 1020) to communicate to the I/O card 132a to ensure that the field device information is received by the I/O card 132a without errors. For example, the I/O bus communication processor 608 can generate cyclical error check (CRC) error checking bits.

The I/O bus communication processor 608 then packetizes the field device information, the field device identification information, the data type descriptor, the destination address of the I/O card 132a, the source address of the termination module 124a, and the error checking data based on an I/O bus communication protocol (block 1022). The I/O bus communication protocol may be implemented using, for example, a TPC-based protocol, a UDP-based protocol, etc. The I/O bus communication processor 608 can obtain the source address of the termination module 124a from the address identifier 604 (FIG. 6). The I/O bus interface 602 (FIG. 6) then communicates the packetized information via the universal I/O bus 136a (FIGS. 1A and 2) in combination with packetized information generated by and communicated by other termination modules (e.g., the termination modules 124b and 124c of FIG. 1A) (block 1024). For example, the I/O bus interface 602 may be provided with an arbitration circuit or device that sniffs or monitors the universal I/O bus 136a to determine when the universal I/O bus 136a is available (e.g., is not being used by the termination modules 124b-c) to communicate the information from the termination module 124a to the I/O card 132a.

If the termination module 124b determines at block 1004 that the communication information detected at block 1002 is not from the field device 112a (e.g., the communication information is from the I/O card 132a), the I/O bus communication processor 608 (FIG. 6) extracts a destination address from the received communication information (block 1026). The I/O bus communication processor 608 then determines if the extracted destination address matches a destination address of the termination module 124a (block 1028) obtained from the address interface 604. If the destination address does not match the address of the termination module 124a (e.g., the received information was not intended for delivery to the termination module 124a) (block 1028), control returns to block 1002 (FIG. 10A). Otherwise, if the destination address matches the address of the termination module 124a (e.g., the received information was intended for delivery to the termination module 124a) (block 1028), the I/O bus communication processor 608 extracts the field device information from the received communication information based on the I/O bus communication protocol (block 1030) and verifies the integrity of the data (block 1032) using, for example, a CRC verification process based on error detection information in the received communication information. Although not shown, if the I/O bus communication processor 608 determines at block 1032 that an error exists in the received communication information, the I/O bus communication processor 608 sends a message to the I/O card 132a requesting a re-transmit.

After verifying the data integrity (block 1032), the I/O bus communication processor 608 (or the field device communication processor 620) determines whether a digital-to-analog conversion is required (block 1034). For example, if a data type descriptor stored in the termination module 124a indicates that the field device 112a requires analog information, then the I/O bus communication processor 608 determines that a digital-to-analog conversion is required (block 1034). If a digital-to-analog conversion is required (block 1034), the digital-to-analog converter 616 (FIG. 6) performs the digital-to-analog conversion on the field device information (block 1036). After the digital-to-analog conversion is performed (block 1036) or if no digital-to-analog conversion is required (block 1034), the field device communication processor 620 communicates the field device information to the field device 112a via the field device interface 622 (FIG. 6) using the field device communication protocol of the field device 112a (block 1038).

After the field device communication processor 620 communicates the field device information to the field device 112a or after the I/O bus communication processor 608 communicates the field device information to the I/O card 132a, the process of FIGS. 10A and 10B is ended and/or control is returned to, for example, a calling process or function.

Figure 11A:
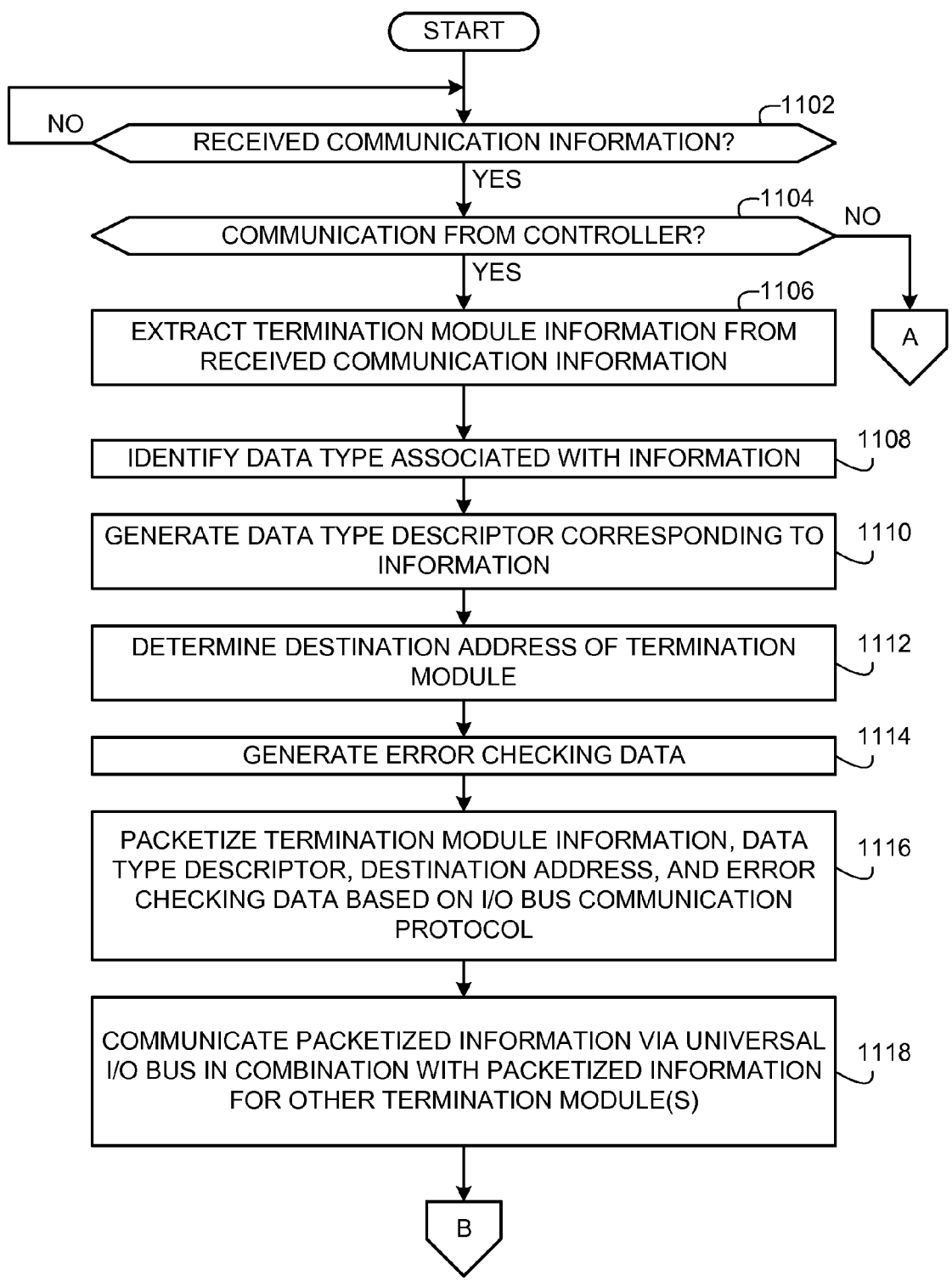
FIGS. 11A and 11B depict a flowchart of an example method that may be used to implement the I/O cards of FIG. 1A to communicate information between the termination modules and a workstation.
Figure 11B:
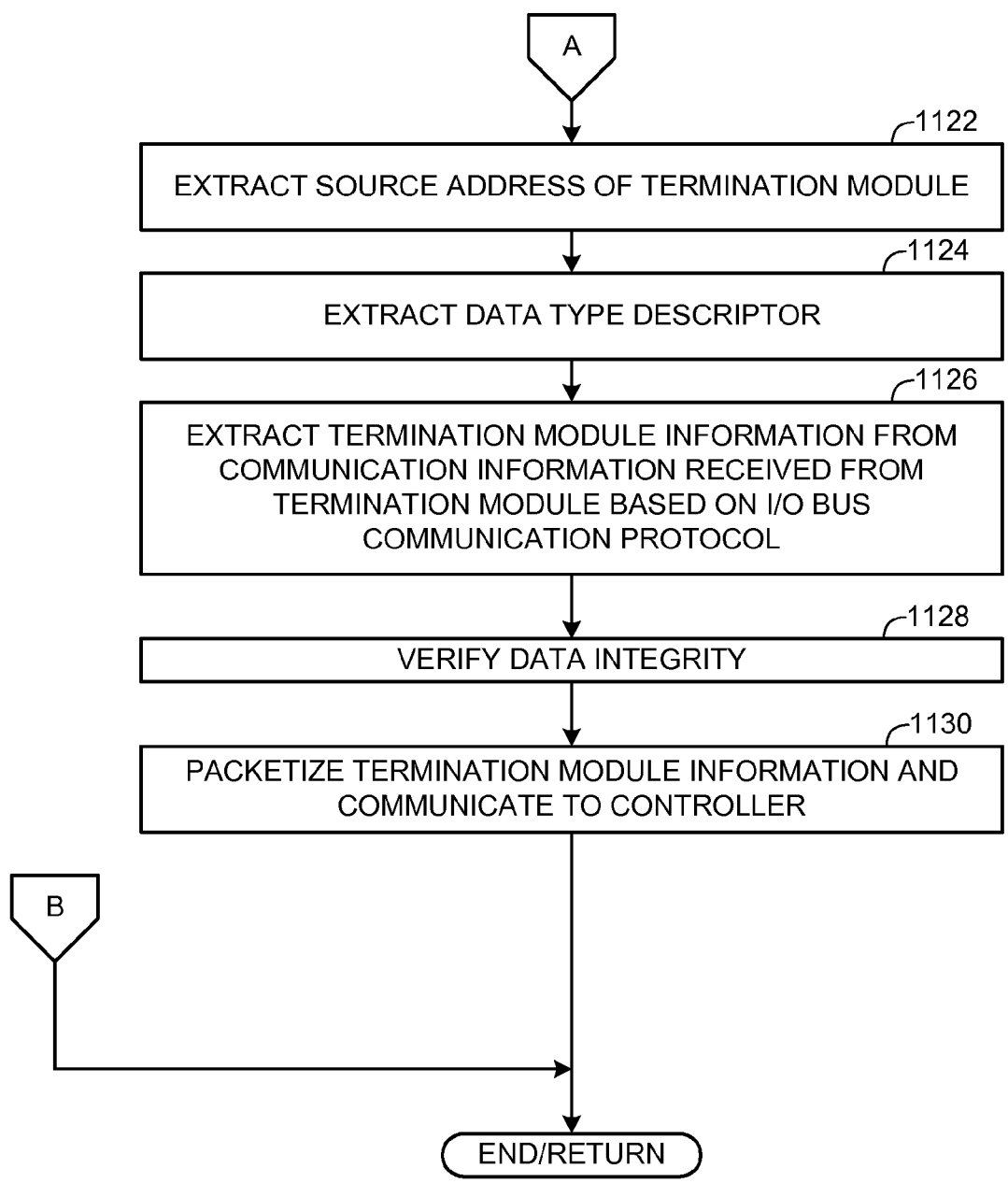

FIGS. 11A and 11B depict a flowchart of an example method that may be used to implement the I/O card 132a of FIG. 1A to exchange information between termination module 124a and the controller 104 of FIG. 1A. Initially, the I/O card 132a determines whether it has received communication information (block 1102). For example, the I/O card 132a determines that it has received communication information if the communication processor 704 (FIG. 7) indicates via, for example, an interrupt or a status register that it has received communication information. If the I/O card 132a determines that it has not received communication information (block 1102), control remains at block 1102 until the I/O card 132a receives communication information.

If the I/O card 132a receives communication information (block 1102), the I/O card 132a determines whether it received the communication information from the controller 104 (FIG. 1A) (block 1104) based on for example an interrupt or status register of the communication processor 704. If the I/O card 132a determines that it has received communication information from the controller 104 (block 1104), then the communication processor 704 extracts the termination module information (which may include field device information) from the received communication information associated with the termination module 124*a* (block 1106).

The communication processor 704 identifies the data type (e.g., field device analog information, field device digital information, termination module control information to control or configure the termination module, etc.) associated with the received termination module information (block 1108) and generates a data type descriptor corresponding to the received termination module information (block 1110). In an alternative example implementation, the data type descriptor is generated at the workstation 102 (FIG. 1A) and the communication processor 704 need not generate the data type descriptor.

The I/O bus communication processor 712 (FIG. 7) then determines the destination address of the termination module 124*a* (block 1112). In addition, the I/O bus communication processor 712 determines error checking data (block 1114) to communicate to the termination module 124*a* with the termination module information to ensure that the termination module 124*a* receives the information without errors. For example, the I/O bus communication processor 712 can generate cyclical error check (CRC) error checking bits.

The I/O bus communication processor 712 then packetizes the termination module information, the data type descriptor, the destination address of the termination module 124*a*, the source address of the termination module 124*a*, and the error checking data based on the I/O bus communication protocol (block 1116). The I/O bus interface 710 (FIG. 7) then communicates the packetized information via the universal I/O bus 136*a* (FIGS. 1A and 2) in combination with packetized information destined for other termination modules (e.g., the termination modules 124*b* and 124*c* of FIG. 1A) (block 1118). For example, the I/O bus communication processor 702 may packetize other termination module information using the destination addresses of, for example, the termination modules 124*b* and 124*c* and communicate termination module information for all of the termination modules 124*a-c* via the universal I/O bus 136*a* using the RS-485 standard. Each of the termination modules 124*a-c* can extract its respective information from the universal I/O bus 136*a* based on the destination addresses provided by the I/O card 132*a*.

If the I/O card 132*a* determines at block 1104 that the communication information detected at block 1102 is not from the controller 104 (e.g., the communication information is from the one of the termination modules 124*a-c*), the I/O bus communication processor 712 (FIG. 7) extracts a source address (e.g., a source address of one of the termination modules 124*a-c*) from the received communication information (block 1122). The I/O bus communication processor 712 then extracts a data type descriptor (e.g., digitally encoded analog data type, digital data type, temperature data type, etc.) (block 1124). The I/O bus communication processor 712 also extracts the termination module information (which may include field device information) from the received communication information based on the I/O bus communication protocol (block 1126) and verifies the integrity of the data (block 1128) using, for example, a CRC verification process based on error detection information in the received communication information. Although not shown, if the I/O bus communication processor 712 determines at block 1128 that an error exists in the received communication information, the I/O bus communication processor 712 sends a re-transmit request message to the termination module associated with the source address obtained at block 1122.

After verifying the data integrity (block 1128), the communication processor 704 packetizes the termination module information (using the source address of the termination module and the data type descriptor) and the communication interface 702 communicates the packetized information to the controller 104 (block 1130). If the information is intended to be delivered to the workstation 102, the controller 104 can subsequently communicate the information to the workstation 102. After the communication interface 702 communicates the information to the controller 104 or after the I/O bus interface 710 communicates the termination module information to the termination module 124*a*, the process of FIGS. 11A and 11B is ended and/or control is returned to, for example, a calling process or function.

Figure 12:
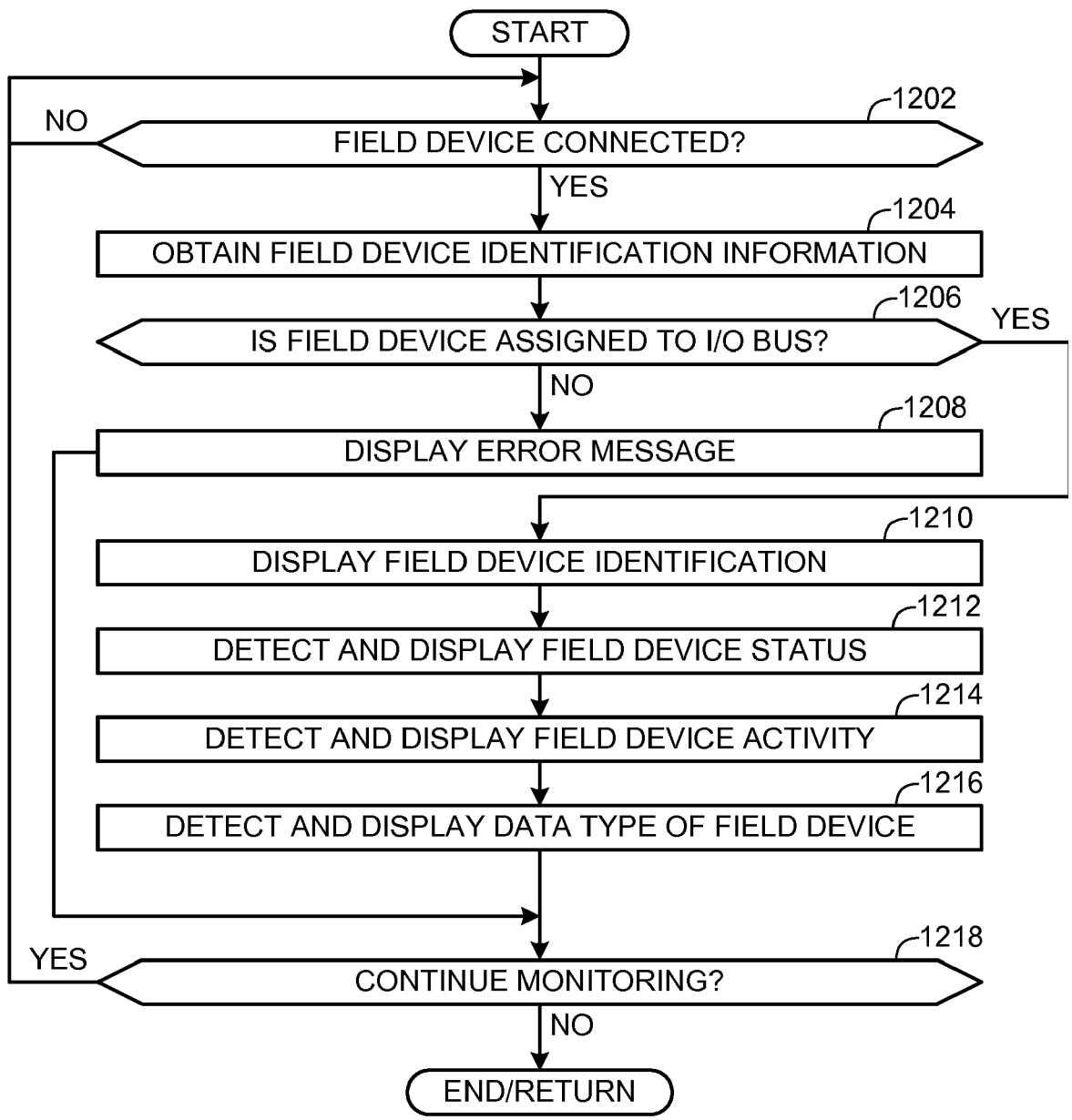
FIG. 12 is a flowchart of an example method that may be used to implement the labeler of FIGS. 2, 3, 6, and 8 to retrieve and display information associated with field devices communicatively coupled to termination modules.

FIG. 12 is a flowchart of an example method that may be used to implement the labeler 214 of FIGS. 2, 3, and 8 to retrieve and display information associated with field devices (e.g., the field device 112*a* of FIG. 1A) communicatively coupled to termination modules (e.g., the termination module 124*a* of FIGS. 1, 2, and 4-6). Initially, the connection detector 806 (FIG. 8) determines whether a field device (e.g., the field device 112*a*) is connected to the termination module 124*a* (e.g., connected to the termination screws 406 of FIGS. 4 and 5 and/or the field device interface 622 of FIG. 6) (block 1202). If the connection detector 806 determines that the field device 112*a* (or any other field device) is not connected to the termination module 124*a* (block 1202) control remains at block 1202 until the connection detector 806 determines that the field device 112*a* (or any other field device) is connected to the termination module 124*a*.

If the connection detector 806 determines that the field device 112*a* is connected to the termination module 124*a* (block 1202), the field device identifier 814 obtains field device identification information (e.g., a device tag value, a device name, an electronic serial number, etc.) that identifies the field device 112*a* (block 1204). For example, the field device identifier 814 can send the field device 112*a* a query requesting the field device 112*a* to transmit its field device identification information. In another example implementation, upon initial connection to the termination module 124*a*, the field device 112*a* can automatically communicate its field device identification information to the field device identifier 814.

The field device identifier 814 then determines if the field device 112*a* is assigned to communicate via the universal I/O bus 136*a* with the I/O card 132*a* (block 1206) based on the field device identification information. For example, the field device identifier 814 can communicate the field device identification information to the I/O card 132*a* via the termination module 124*a* and the I/O card 132*a* can compare the field device identification information with field device identification numbers stored in the data structure 133 (FIG. 1A) or in a similar data structure stored in the workstation 102. The data structure 133 can be populated by engineers, operators, or users with field device identification numbers of field devices (e.g., the field devices 112*a-c*) that are to communicate with the I/O card 132*a* via the universal I/O bus 136*a*. If the I/O card 132*a* determines that the field device 112*a* is assigned to the I/O bus 136*a* and/or the I/O card 132*a*, the I/O card 132*a* communicates a confirmation message to the field device identifier 814.

If the field device identifier 814 determines that the field device 112*a* is not assigned to communicate via the I/O bus 136*a* (block 1206), the display interface 808 (FIG. 8) displays an error message (block 1208). Otherwise, the display interface 808 displays the field device identification information (block 1210). In the illustrated example, the field device status detector 812 detects the field device status (e.g., device on, device off, device error, etc.) and the display interface 808 displays the status information (block 1212). In addition, the field device activity detector 810 (FIG. 8) detects the activity of the field device 112a (e.g., measurement and/or monitoring information) and the display interface 808 displays the activity information (block 1214). Also, the data type detector 816 (FIG. 8) detects the data type (e.g., analog, digital, etc.) of the field device 112a and the display interface 808 displays the data type (block 1216).

After the display interface 808 displays the error message (block 1208) or after the display interface 808 displays the data type (block 1216), the labeler 214 determines whether it should continue monitoring (block 1218) based on, for example, whether the termination module 124a has been turned off or unplugged from the marshalling cabinet 122 (FIGS. 1A and 2). If the labeler 214 determines that it should continue monitoring, control is passed back to block 1202. Otherwise, the example process of FIG. 12 is ended and/or control is returned to a calling function or process.

Figure 13:
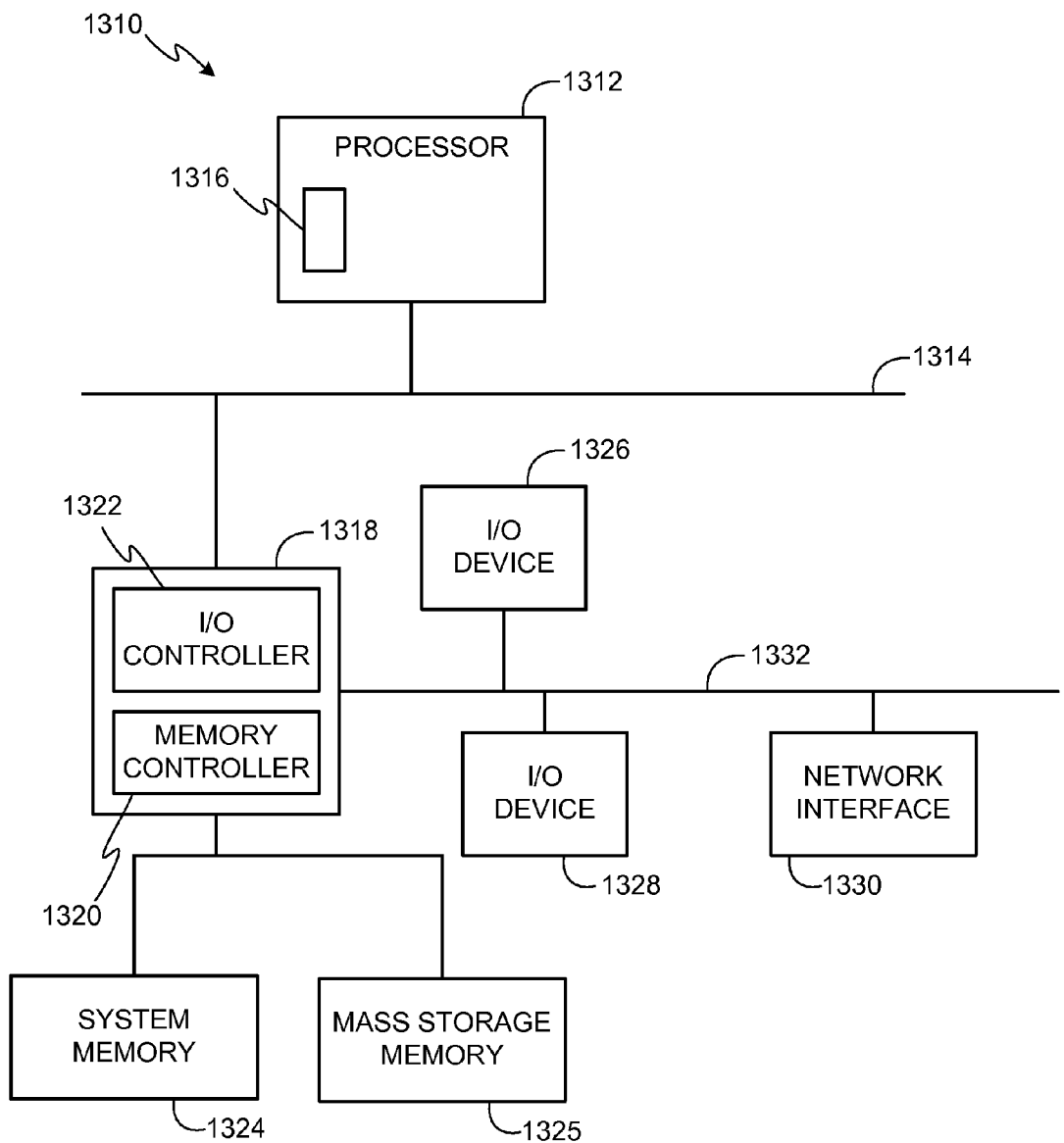
FIG. 13 is a block diagram of an example processor system that may be used to implement the example systems and methods described herein.

FIG. 13 is a block diagram of an example processor system 1310 that may be used to implement the apparatus and methods described herein. For example, processor systems similar or identical to the example processor system 1310 may be used to implement the workstation 102, the controller 104, the I/O card 132a, and/or the termination modules 124a-c and 126a-c of FIG. 1A. Although the example processor system 1310 is described below as including a plurality of peripherals, interfaces, chips, memories, etc., one or more of those elements may be omitted from other example processor systems used to implement one or more of the workstation 102, the controller 104, the I/O card 132a, and/or the termination modules 124a-c and 126a-c.

As shown in FIG. 13, the processor system 1310 includes a processor 1312 that is coupled to an interconnection bus 1314. The processor 1312 includes a register set or register space 1316, which is depicted in FIG. 13 as being entirely on-chip, but which could alternatively be located entirely or partially off-chip and directly coupled to the processor 1312 via dedicated electrical connections and/or via the interconnection bus 1314. The processor 1312 may be any suitable processor, processing unit or microprocessor. Although not shown in FIG. 13, the system 1310 may be a multi-processor system and, thus, may include one or more additional processors that are identical or similar to the processor 1312 and that are communicatively coupled to the interconnection bus 1314.

The processor 1312 of FIG. 13 is coupled to a chipset 1318, which includes a memory controller 1320 and a peripheral input/output (I/O) controller 1322. As is well known, a chipset typically provides I/O and memory management functions as well as a plurality of general purpose and/or special purpose registers, timers, etc. that are accessible or used by one or more processors coupled to the chipset 1318. The memory controller 1320 performs functions that enable the processor 1312 (or processors if there are multiple processors) to access a system memory 1324 and a mass storage memory 1325.

The system memory 1324 may include any desired type of volatile and/or non-volatile memory such as, for example, static random access memory (SRAM), dynamic random access memory (DRAM), flash memory, read-only memory (ROM), etc. The mass storage memory 1325 may include any desired type of mass storage device. For example, if the example processor system 1310 is used to implement the workstation 102 (FIG. 1A), the mass storage memory 1325 may include a hard disk drive, an optical drive, a tape storage device, etc. Alternatively, if the example processor system 1310 is used to implement the controller 104, one of the I/O cards 132a-b and 134a-b, or one of the termination modules 124a-c and 126a-c, the mass storage memory 1325 may include a solid-state memory (e.g., a flash memory, a RAM memory, etc.), a magnetic memory (e.g., a hard drive), or any other memory suitable for mass storage in the controller 104, the I/O cards 132a-b and 134a-b, or the termination modules 124a-c and 126a-c.

The peripheral I/O controller 1322 performs functions that enable the processor 1312 to communicate with peripheral input/output (I/O) devices 1326 and 1328 and a network interface 1330 via a peripheral I/O bus 1332. The I/O devices 1326 and 1328 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The network interface 1330 may be, for example, an Ethernet device, an asynchronous transfer mode (ATM) device, an 802.11 device, a DSL modem, a cable modem, a cellular modem, etc. that enables the processor system 1310 to communicate with another processor system.

While the memory controller 1320 and the I/O controller 1322 are depicted in FIG. 13 as separate functional blocks within the chipset 1318, the functions performed by these blocks may be integrated within a single semiconductor circuit or may be implemented using two or more separate integrated circuits.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. An apparatus to communicatively couple field devices to a controller in a process control system, the apparatus comprising:
  a base comprising:
    a first physical interface to be communicatively coupled to different types of field devices and exchange communications with one or more of the field devices via a plurality of different communication protocols; and
    a second physical interface to communicatively couple the base to a bus to communicate with the controller; and
  a module removably attachable to the base and to communicate with the controller via the second physical interface of the base, the module comprising:
    a connector to communicatively couple the module to the base; and
    a processor to be in communication with the first physical interface and configured to encode first information from any of the different types of field devices for communication via the bus using a second communication protocol different from the plurality of different communication protocols.

2. An apparatus as defined in claim 1, wherein the second communication protocol is to communicate information on the bus from a plurality of other processors in communication with the bus and in communication with respective field devices.

3. An apparatus as defined in claim 1, wherein the bus includes an electrical conductor.

4. An apparatus as defined in claim 1, further comprising an address identifier configured to determine a source address of the apparatus, wherein the processor communicates the source address of the apparatus in association with the first information.

5. An apparatus as defined in claim 1, further comprising a data type detector configured to identify a data type associated with the first information based on an indicator in the first information.

6. An apparatus as defined in claim 1, wherein the processor is configured to generate header information identifying a data type associated with the first information and communicate the header information in association with the first information.

7. An apparatus as defined in claim 6, wherein the header information includes identification information indicative of one of the field devices in communication with the first physical interface.

8. An apparatus as defined in claim 1, wherein the processor is configured to decode third information received via the bus using the second communication protocol, and wherein the first physical interface is configured to communicate the third information to one of the field devices in communication with the first physical interface using a corresponding one of the different communication protocols.

9. A tangible machine accessible storage medium having instructions stored thereon that, when executed, cause a machine to at least:
receive first information from a base having a first physical interface configured to be communicatively coupled to different types of field devices and exchange communications with one or more of the field devices via a plurality of different communication protocols;
at a module removably attached to the base, encode the first information for communication using a second communication protocol different from the plurality of different communication protocols; and
communicate the encoded first information from the module, via a second physical interface of the base, to a controller via a bus using the second communication protocol.

10. A tangible machine accessible storage medium as defined in claim 9 having instructions stored thereon that, when executed, cause the machine to detect when the module is coupled to the base.

11. A tangible machine accessible storage medium as defined in claim 9 having instructions stored thereon that, when executed, cause the machine to communicate the first information via the bus, the bus being configured to communicate information from a plurality of other modules in communication with the bus and in communication with respective field devices via respective bases.

12. A tangible machine accessible storage medium as defined in claim 9 having instructions stored thereon that, when executed, cause the machine to determine at least one of field device identification information indicative of one of the field devices in communication with the first physical interface or a status of the one of the field devices in response to receiving the first information from the base.

13. A tangible machine accessible storage medium as defined in claim 9 having instructions stored thereon that, when executed, cause the machine to:
identify a data type associated with the first information;
generate a data type descriptor corresponding to the data type; and
communicate the data type descriptor via the bus in association with the first information.

14. A tangible machine accessible storage medium as defined in claim 9 having instructions stored thereon that, when executed, cause the machine to:
receive third information via the bus using the second communication protocol; and
communicate the third information to one of the field devices in communication with the first physical interface using a corresponding one of the different communication protocols.

15. A tangible machine accessible storage medium as defined in claim 14 having instructions stored thereon that, when executed, cause the machine to:
identify a data type descriptor associated with the third information; and
select the corresponding one of the different communication protocols based on the data type descriptor to communicate the third information to the one of the field devices.

16. A tangible machine accessible storage medium as defined in claim 9 having instructions stored thereon that, when executed, cause the machine to:
access a data structure having a plurality of field device identification numbers; and
determine whether one of the field devices is connected in error to the first physical interface based on the plurality of field device identification numbers in the data structure.

17. A tangible machine accessible storage medium as defined in claim 9 having instructions stored thereon that, when executed, cause the machine to generate timestamp information associated with the first information and to communicate the timestamp information in association with the first information via the bus using the second communication protocol.

18. A tangible machine accessible storage medium as defined in claim 17, wherein the timestamp information includes sub-millisecond range timestamps.

19. A method to communicate information between a controller and field devices in a process control system, the method comprising:
receiving first information at a base having a first physical interface configured to be communicatively coupled to different types of field devices and exchange communications with one of more of the field devices via a plurality of different communication protocols;
at a module removably attached to the base, encoding the first information for communication using a second communication protocol different from the plurality of different communication protocols; and
communicating the encoded first information from the module, via a second physical interface of the base, to a controller via a bus using the second communication protocol.

20. A method as defined in claim 19, wherein the second communication protocol is to communicate information on the bus from a plurality of other modules in communication with the bus and in communication with respective field devices via respective bases.

21. A method as defined in claim 19, further comprising automatically associating at least one of field device identification information or status information with one of the field devices in communication with the first physical interface in response to receiving communication information from the one of the field devices.

22. A method as defined in claim 19, further comprising:

identifying a data type associated with the first information;

generating a data type descriptor indicative of the data type; and communicating the data type descriptor via the bus in association with the first information.

23. A method as defined in claim 19, further comprising:

receiving third information via the bus using the second communication protocol; and communicating the third information to one of the field devices in communication with the first physical interface using a corresponding one of the different communication protocols.

24. A method as defined in claim 23, further comprising:

identifying a data type descriptor associated with the third information; and selecting the corresponding one of the different communication protocols based on the data type descriptor to communicate the third information to the one of the field devices.

25. A method as defined in claim 19, further comprising:

accessing a data structure having a plurality of field device identification numbers; and determining whether one of the field devices is connected in error to the first physical interface based on the plurality of field device identification numbers in the data structure.

\* \* \* \* \*